United States Patent [19]
Nagare et al.

[11] Patent Number: 4,736,555
[45] Date of Patent: Apr. 12, 1988

[54] FREE ACCESS TYPE FLOOR

[75] Inventors: Shouzi Nagare, Shiga; Fuziaki Yamakawa, Kyoto; Akio Ishimoto, Kashihara; Yasuo Inukai, Shiga; Tadahiro Sugamura, Hirakata; Soutarou Takino, Tokyo; Toshiaki Shirakawa, Uji, all of Japan

[73] Assignee: Sekisui Kagaku Kogyo Kabushiki Kaisha, Osaka, Japan

[21] Appl. No.: 864,851

[22] Filed: May 20, 1986

[30] Foreign Application Priority Data

| May 22, 1985 | [JP] | Japan | 60-76911[U] |
| May 23, 1985 | [JP] | Japan | 60-76729[U] |
| May 24, 1985 | [JP] | Japan | 60-78354[U] |
| Feb. 14, 1986 | [JP] | Japan | 61-20763[U] |

[51] Int. Cl.$^4$ .............................................. E04R 2/82
[52] U.S. Cl. .............................. 52/126.6; 52/126.4; 52/167; 52/263; 248/561; 248/624; 248/544
[58] Field of Search ............... 52/126.6, 263, 126.4, 52/127.7, 126.3, 126.5, 122.1, 167; 248/561, 563, 624, 544

[56] References Cited

U.S. PATENT DOCUMENTS

| 3,505,764 | 4/1970 | Gutierrez | 52/263 X |
| 3,811,237 | 5/1974 | Bettinger | 52/126.6 |
| 3,924,370 | 12/1975 | Gauceglia et al. | 52/263 X |
| 4,277,923 | 7/1981 | Rebentisch et al. | 52/126.6 |
| 4,279,109 | 7/1981 | Madl, Jr. | 52/263 |
| 4,555,880 | 12/1985 | Gzym et al. | 52/263 X |
| 4,598,503 | 7/1986 | Berger et al. | 52/167 X |

FOREIGN PATENT DOCUMENTS

| 1196345 | 8/1965 | Fed. Rep. of Germany | 52/126.6 |
| 2102139 | 8/1972 | Fed. Rep. of Germany | 52/126.6 |
| 2915115 | 12/1979 | Fed. Rep. of Germany | 52/126.6 |
| 2418319 | 10/1979 | France | 52/126.6 |
| 590419 | 1/1978 | U.S.S.R. | 52/263 |

Primary Examiner—Carl D. Friedman
Assistant Examiner—Richard E. Chilcot, Jr.
Attorney, Agent, or Firm—Spencer & Frank

[57] ABSTRACT

A free access type floor comprising a plurality of floor boards arranged on one and the same plane in a closely connected manner to form a secondary floor, engaging members provided at at least each corner of each of said floor boards, and support members provided with floor board-engaging means, which are adjustable in height, for detachably engaging with said adjacent engaging members of adjacent floor boards on one and the same plane to support said floor boards in a closely connected manner, and a method for installing the same.

35 Claims, 49 Drawing Sheets

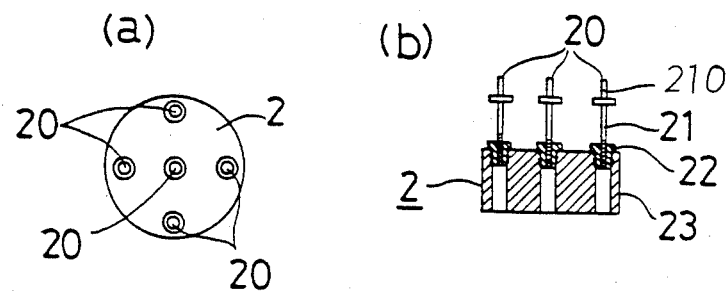
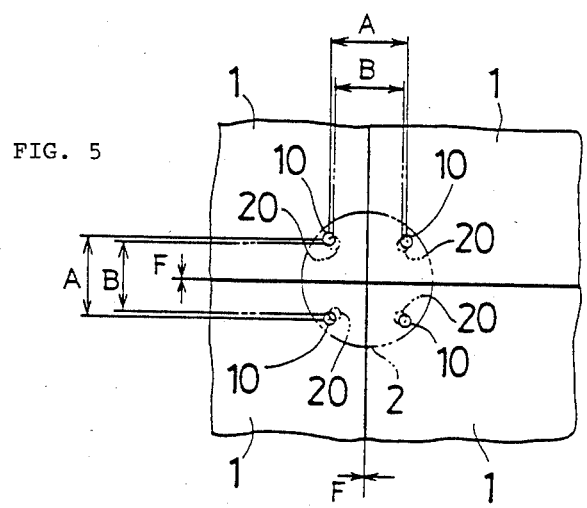
FIG. 5
FIG. 6
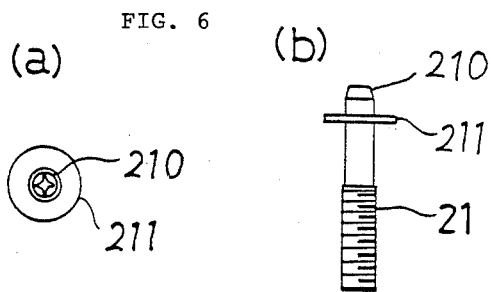

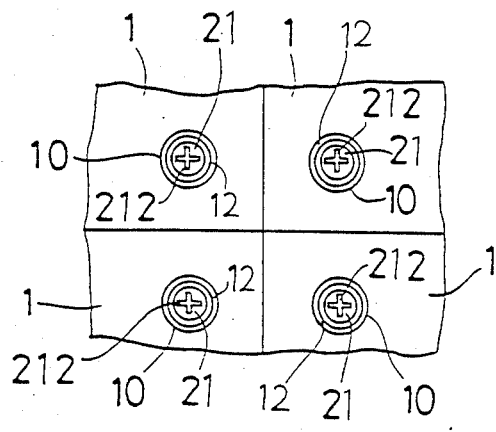
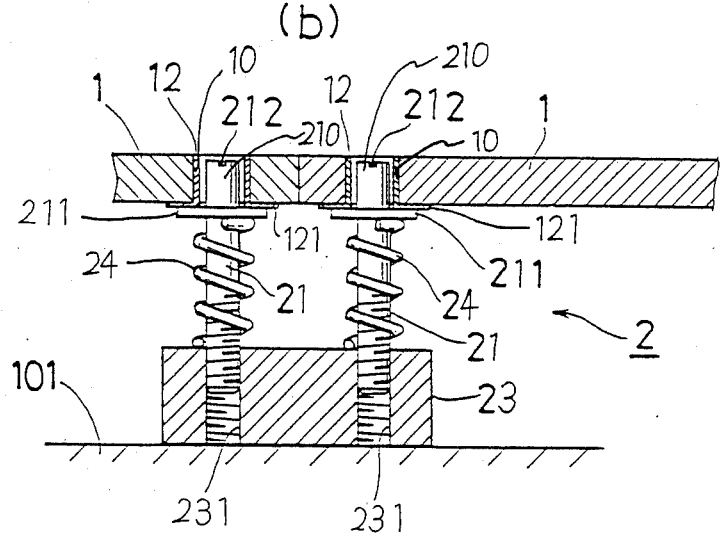
FIG. 8

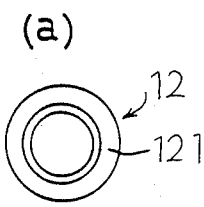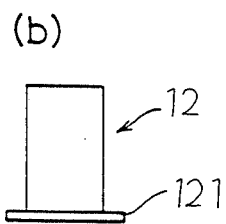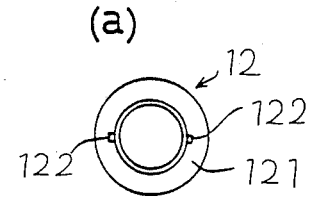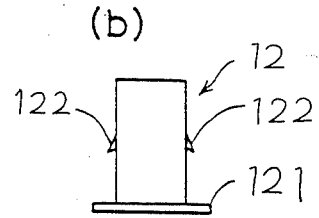
FIG. 9     FIG. 10
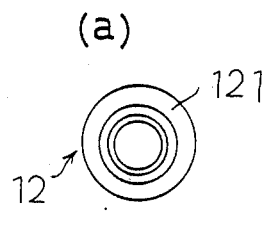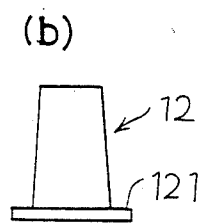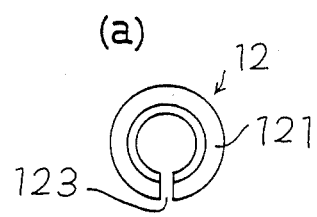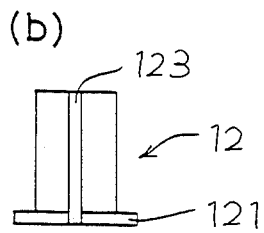
FIG. 11     FIG. 12

(a)
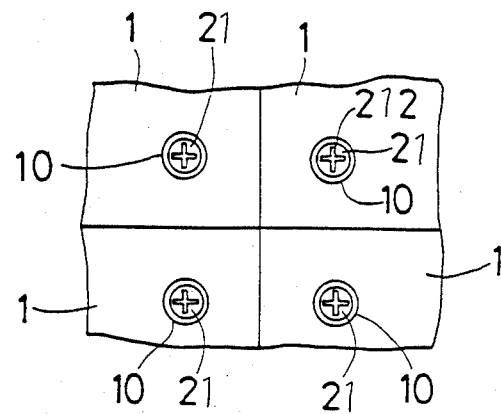
(b)
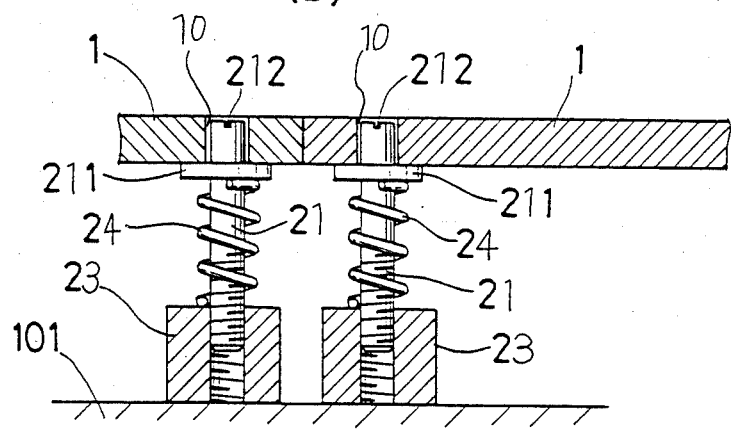
FIG. 16

(a)
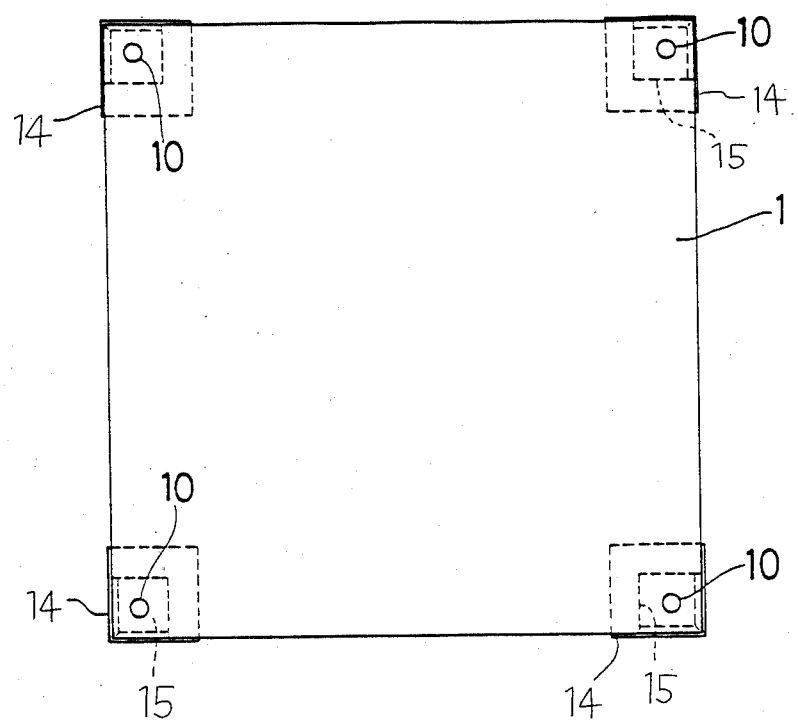
(b)
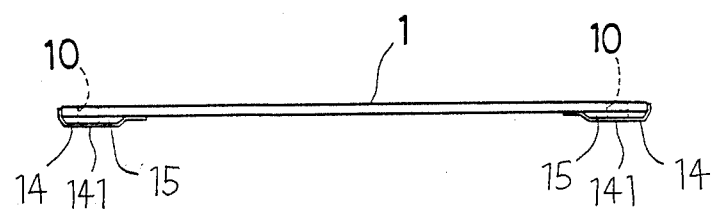
FIG. 18

FIG. 23
(a)
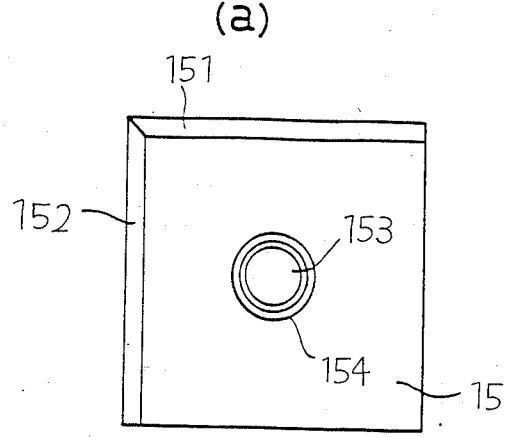
(b)
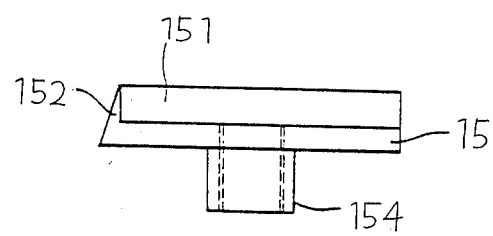

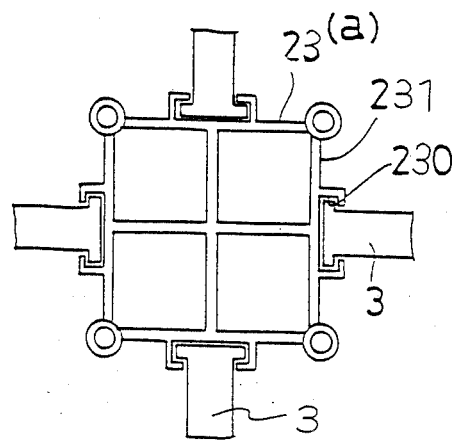
FIG. 34
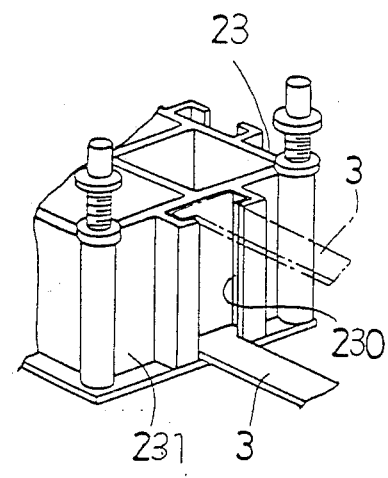
FIG. 36
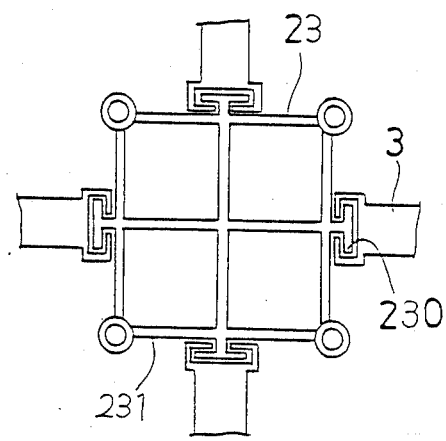

FIG. 39
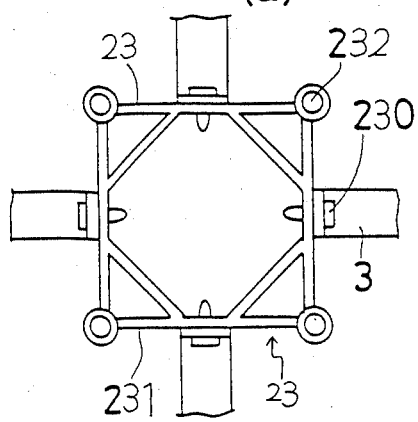
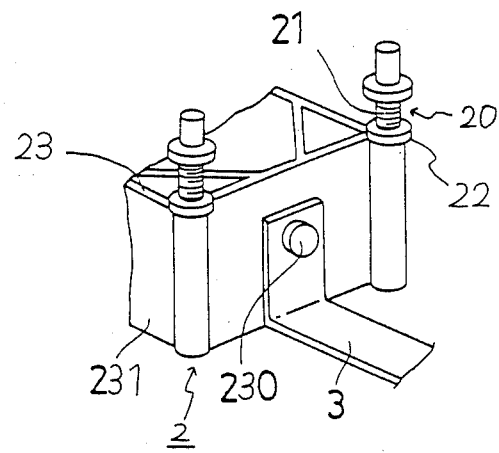
FIG. 41
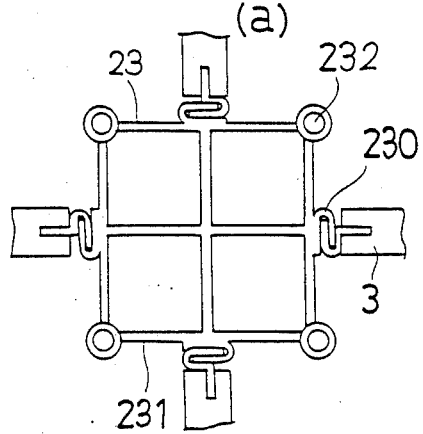
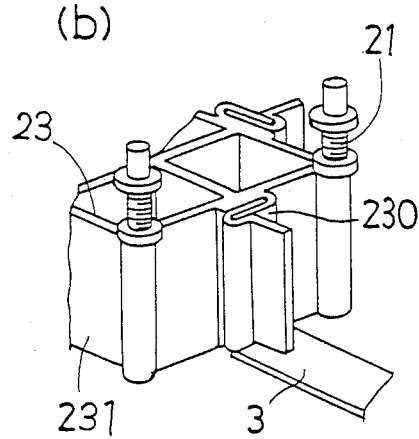

FIG. 51
(a)
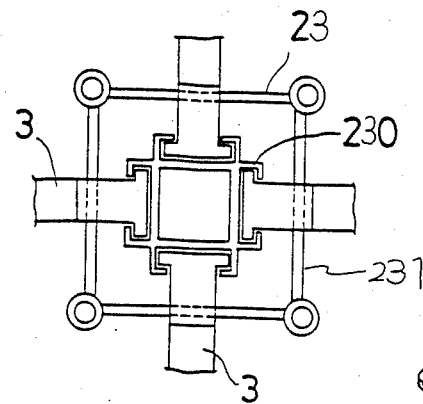
(b)
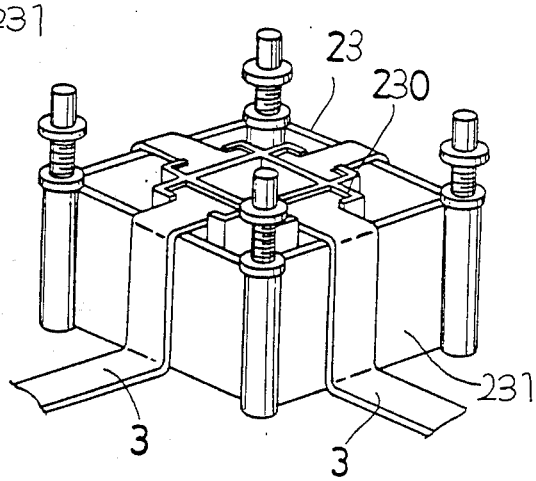
FIG. 52
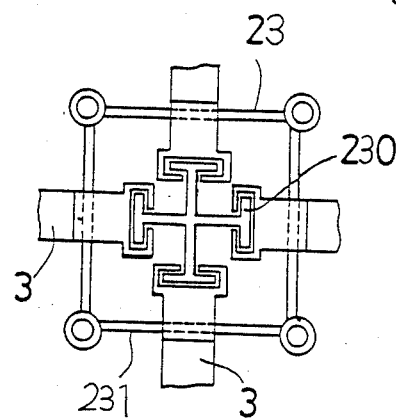

FIG. 53
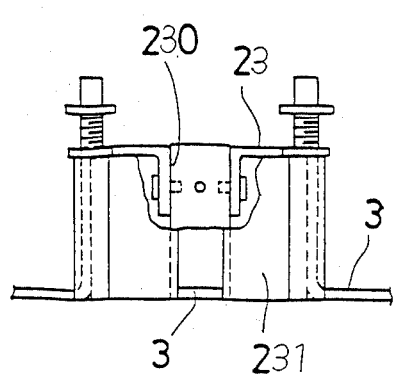
FIG. 54
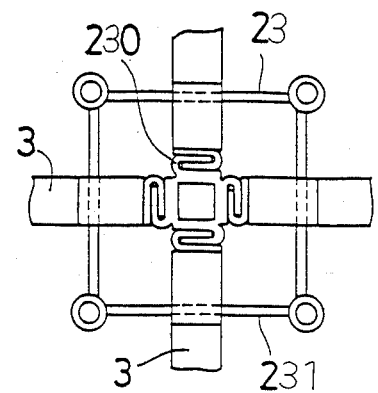
(a)
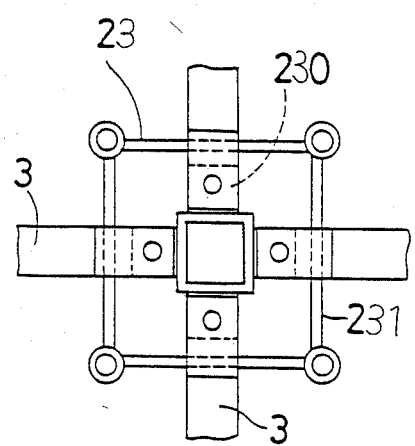
FIG. 55
(b)
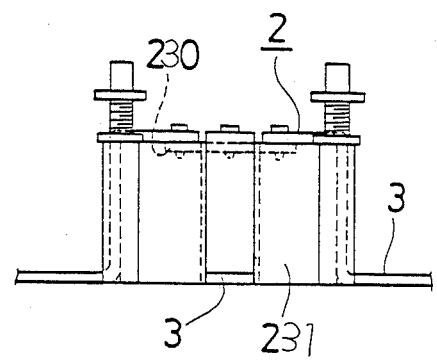

FIG. 56
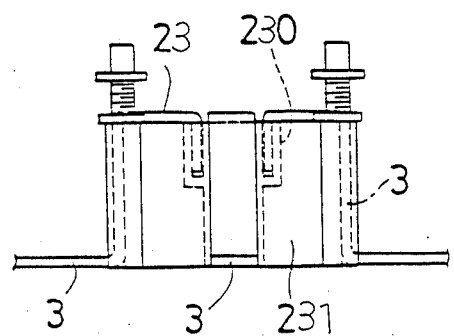
FIG. 57
(a)
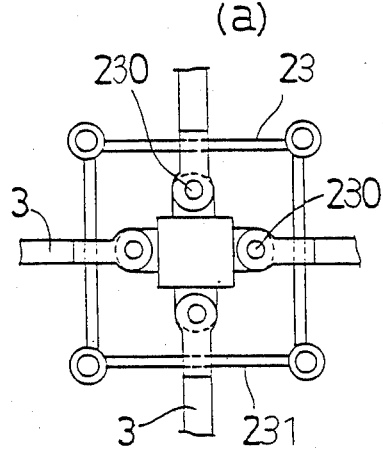
(b)
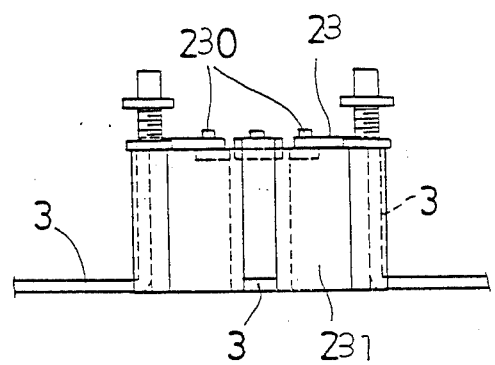

FREE ACCESS TYPE FLOOR

BACKGROUND OF THE INVENTION

1. Field of the invention

The present invention relates to a free access type floor, in which a secondary floor forming a wiring or air conditioning duct chamber or the like is formed, and a method of installing the same, in particular as a free access type floor, in which a plurality of floor boards are arranged in a closely connected manner on a single plane to form a secondary floor, for use in an electronic computer room, wherein wiring cables or codes and the like are disposed, or an office, wherein various kinds of office apparatus are arranged, and a method of installing the same. The present invention relates also to a free access type floor having a construction in which a plurality of floor board layers are engaged with a support member separately and independently.

2. Description of the prior art

Installation of office apparatus and communication apparatus in offices has increased with the development of office automation. Accordingly, wires and pipes must be installed. In order to simplify such construction, secondary floors have been constructed at a given height above the primary floor. Free access type floors comprising floor panels for forming a secondary floor on the primary floor and a support member for supporting said floor panels on the primary floor in a closely connected manner can be classified into those in which floor boards and the support member are separately formed, and those in which the floor boards and the support member are integrally formed.

The latter, as shown in FIG. 77, are provided with support members b mounted on each of the corner portions of the lower surface of a floor panel a, the secondary floor being formed by laying said support members b on the primary floor.

With such free access type floors, in which the floor panel and the support members are integrally formed, all floor panels are laid, and subsequently, the panels required for wiring must be removed. If the wiring density is high, there is the possibility that some wires are forced under the support members, leading to electrical troubles after the floor panels are laid upon the completion of the wiring.

The former, as shown in FIG. 78, are provided with a plurality of support members c, which are provided with engaging portions d in the upper portion thereof, mounted on the appointed positions of the primary floor with adhesives or anchor bolts, floor boards e being laid on the support members c by inserting the engaging portions d of the support members c into engaging holes f of the floor board e to form a double floor. With such a free access type floor, in which floor boards and support members are separately formed, it is indispensable to carefully determine the positions of the support members on the primary floor. After the positions of the support members to be installed are determined, the support members must be mounted on the floor with adhesives or the like. Since the support members are mounted on the floor, damage to the primary floor is inevitable.

Also, there are floors in which a runner comprising a positioning sheet or the like is arranged on the primary floor in combination with a pedestal, floor boards being laid on the pedestal, and each floor board being mounted by means of a locking means. With such free access type floors, the position of the pedestal sometimes shifts from the appointed position on the floor due to production tolerance. Hence superiority in construction and a precise finished size cannot be achieved. Also, fasteners cannot securely fix the floor boards to each other, so that the floor boards are apt to shift. Besides, since a runner is used, the material and construction costs are high.

In addition, floors, in which adjacent corner portions of floor boards are arranged on a single bolt, which is mounted on the floor in a closely connected manner, have been developed. In this case, a support plate is placed between two nuts screwed onto the bolt. The corner portions of each floor board are placed on said support plate. In this case, adjustment of the height of the corners can be simultaneously carried out for all floor boards. But, the adjustment of the height of the floor boards must be carried out by rotating the nuts before the floor boards are placed on the support plate. Accordingly, it is necessary to remove the floor board in order to adjust its height at a later date. In addition, since the corner portions of the adjacent floor boards must be simultaneously adjusted in height, minute regulation of each floor board in height can not be carried out, if the floor boards are different in thickness from each other. Since the support plate for supporting the floor board is mounted by means of the nuts, the nuts are apt to become loose by vibration due to travel on the floor boards. There is, therefore, the possibility that the height of the floor boards will change with use. In addition, there is the possibility that floor boards will become damaged at portions where the support plates are in contact with the floor board.

In order to eliminate this problem, the threaded portion of the bolt can be covered with an adhesive after the adjustment of the height of the floor board. However, if floor boards are replaced due to the breakage or the like, and if the floor boards are different in thickness from each other, the height cannot be adjusted thereby making it difficult to maintain an equal height over the total floor surface.

Another method, in which a bolt is fastened at the side by means of a locking bolt after the adjustment of the height of the floor board, has been proposed. However, the locking bolt itself can become loose due to vibrations of the floor board, so that the bolt cannot be securely fixed. In addition, there is the possibility that travel on the upper surface of the floor board will lead to the generation of noise resulting from contact with the adjacent floor boards and the contact of the floor board with the shores. In order to prevent such noise, adjacent floor boards or the floor board and the shores have been provided with a soundproofing material such as rubber sheet. However, in the case where the adjacent floor boards or the floor board and the shores are provided with soundproofing material at only any one of the facing portions thereof, sufficient soundproofing cannot be achieved. In addition, in the case where the soundproofing material is inserted between the floor boards, said soundproofing material is often caught on the floor boards and as a result, engagement of the floor boards with each other becomes difficult, whereby it is difficult to arrange the floor boards in a closely connected manner to form a single plane.

In each of the above-mentioned cases, the secondary floor is constructed on one plane over the primary floor and the wiring space, defined by the secondary floor adn the primary floor, and is not divided into a separate space for electric power cables and signal cables. Accordingly, wires for electric power have an electromagnetic influence upon signal wires leading to the modulation of signals to and from the office apparatus. In order to avoid such a phenomenon, a floor material, in which this wiring space can be divided into two layers by a cable-housing separator, has been proposed. In this floor, since said cable-housing separator and floor boards are engaged with each other by means of uneven engaging members and are integrally supported on the floor by means of supporting members, adjustment of the space formed by the separator is almost impossible. Accordingly, the wires cannot be housed in the appointed space when the quantity of wires becomes large. In addition, the engagement of the floor boards with the separator is insufficient, so that there is the possibility that the floor panels become separated from the engaging members due to vibrations of the floor and the like. Furthermore, known separators are not provided witha drainage mechanism, which leads to possible damage when liquids are spilled on the secondary floor and accumulate in the separator area.

SUMMARY OF THE INVENTION

The free access type floor of this invention which overcomes the above-discussed and numerous other disadvantages and deficiencies of the prior art, comprises a plurality of floor boards arranged on one and the same plane in a closely connected manner to form a secondary floor, engaging members provided at at least each corner of each of said floor boards, and support members provided with a floor board-engaging means, which are adjustable in height, for detachably engaging with said adjacent engaging members of adjacent floor boards on one and the same plane to support said floor boards in a closely connected manner.

The distance between the centers of said adjacent engaging members of the adjacent floor boards on one and the same plane is, in a preferred embodiment, set so as to be larger than the distance between the centers of said floor board-engaging means corresponding to said distance between said engaging members. In a preferred embodiment, one of said engaging members and said floor board-engaging means of the floor board engaging with said engaging member is a flange bolt while the other is an engaging hole with which said flange bolt can be engaged. A compression spring is, in a preferred embodiment, provided between said flange bolt and said nut. Both said flange bolt and said hole engageable with said flange bolt have, in a preferred embodiment, a deformed longitudinal section. A short collar tube is, in a preferred embodiment, inserted into said engaging hole.

A buffer member is, in a preferred embodiment, inserted between said engaging member and said floor board-engaging means, said buffer member being brought into contact with an end face of each corner of said engagingmeans and the floor board by engaging said engaging member with said floor board-engaging means. The end face of said buffer member connected to the end face of each corner of the floor board is, in a preferred embodiment, tapered.

The support member is, in a preferred embodiment, provided with a pedestal integrally provided with an engaging means-supporting portion for detachably supporting said floor board-engaging means. The floor board-engaging means is, in a preferred embodiment, a flange bolt. The pedestal is, in a preferred embodiment, a nut member screwed in the flange bolt and mounted on the floor. The engaging means-supporting portion is, in a preferred embodiment, a nut member screwed on the flange bolt. The engaging means-supporting portion of the pedestal is, in a preferred embodiment, a cylindrical body provided with a cavity having a polygonal section vertical to the axis shaft line thereof, said flange bolt being detachably supported by a cylindrical body-supporting portion through a flange nut having a polygonal cross section attached to said supporting portion of said cylindrical body. The engaging means-supporting portion is, in a preferred embodiment, positioned at each of the four corners of said pedestal. Alternatively, the engaging means-supporting portion is positioned at the center of the pedestal. The pedestal is, in a preferred embodiment, in the shape of a cylinder, cone or truncated cone.

The support members are, in a preferred embodiment, connected to each other by means of a detachable connecting means. The connecting means is in a preferred embodiment, provided with connecting members previously constructed in the form of a framework. The connecting member is, in a preferred embodiment, provided with a stepped portion at each of the end portions thereof. The stepped portions provided at the end portions of the connecting member are, in a preferred embodiment, engaged with each other one upon another.

The support member is, in a preferred embodiment, provided with a pedestal provided with engaging members of the connecting means on four sides, said connecting means being composed of a connecting member which can be detachably connected with said engaging members of the connecting means of the pedestal at both ends thereof. Alternatively, the support member is provided with a pedestal provided with connecting arms extending on four sides, the ends of said connecting arms being detachably connected with each other by means of said connecting means. Alternatively, the support member is provided with a pedestal provided with connecting arms extending on two sides, the connecting arms extending from the adjacent pedestal being detachably connected with each other by means of said connecting means provided on the other two sides of said pedestal.

The pedestal is, in a preferred embodiment, provided with an engaging member of the connecting means for detachably connecting said connecting means with each other at the center thereof. Alternatively, the pedestal is provided with a frame member. The frame member is, in a preferred embodiment, provided with a reinforcing rib. Alternatively, the frame member is provided with a cover plate covering the base. The cover plate is, in a preferred embodiment, mounted on the base of the frame member by welding. Alternatively, the cover plate is mounted on the base of the frame member by engaging a support rod standing at a corner thereof with said floor board engaging means-supporting portion of the frame member.

At least one layer of the cable-separator is, in a preferred embodiment, detachably engaged with said support member. The cable-separator is, in a preferred embodiment, adjustable in height. The cable-separator is, in a preferred embodiment, engaged with the floor board-engaging means of the support member. Alternativley, the cable-separator is supported on the support member by engaging means which are independent of said floor board-engaging means. The cable-separator is, in a preferred embodiment, provided with drain holes in the cable-housing area. The outermost portion of said cable-housing area of said cable-separator forms, in a preferred embodiment, a drain groove. The cable-separator is, in a preferred embodiment, provided with wire-inserting notched portions in the outer portions thereof.

The method for installing the free access type floor of this invention which overcomes the above-discussed and numerous other disadvantages and deficiencies of the prior art, comprises floor boards for forming a secondary floor on a primary floor and support members for supporting said floor boards on the primary floor in a closely connected manner, wherein said support members are connected to each other on the primary floor by means of a detachable means, said floor boards being laid on said support members.

The connecting means are, in a preferred embodiment, provided with connecting members previously constructed in the form of a framework. The connecting member is, in a preferred embodiment, provided with a stepped portion at each of the end portions thereof. The stepped portions provided at the end portions of the connecting member are, in a preferred embodiment, engaged with each other one upon another.

The support member is, in a preferred embodiment, provided with a pedestal provided with engaging members on four sides, said connecting means being composed of a connecting member which can be detachably connected to said engaging member at both ends thereof. Alternatively, the support member is provided with a pedestal provided with connecting arms extending on four sides, the ends of said connecting arms being detachably connected with each other by means of said connecting means. Alternatively, the support member is provided with a pedestal provided with connecting arms extending on two sides, the connecting arms extending from the adjacent pedestal being detachably connected with each other by means of said connecting means provided on the other two sides of said pedestal.

Thus, the invention described herein makes possible the objects of (1) providing a free access type floor in which the positions of floor boards and a pedestal are set up as designed and do not move during and after construction; (2) providing a free access type floor in which the connection of floor boards to the pedestal, connection of adjacent floor boards with each other, and the adjustment of the height of the floor boards can always be easily carried out. As a result, the floor boards do not separate from their shoring due to shifting thereof, stepping on the floor surface and the like; (3) providing a free access type floor which is very simple in construction and easy to assembly; (4) providing a free access type floor which is remarkably inexpensive in materials and construction since runners are not used; (5) providing a free access type floor in which floor boards can be prevented from being damaged when they are supported on the floor; (6) providing a free access type floor in which bolts for supporting floor boards can be securely fixed; (7) providing a free access type floor in which noise due to contact of floor boards among themselves and contact of the floor boards with the pedestal can be prevented; (8) providing a free access type floor in which inking for positioning of support members is not required even though floor boards and support members are separately formed; (9) providing a free access type floor which can be constructed without adhering support members to a floor surface; (10) providing a free access type floor which is easy to remove and transfer; (11) providing a free access type floor in which there is no possibility that floor boards are damaged by flange bolts; (12) providing a free access type floor in which flange bolts can be easily engaged with floor boards; (13) providing a free access type floor in which support members for supporting floor boards on the floor are superior in strength in spite of their having thin walls and being light; (14) providing a free access type floor in which support members are superior in vibration resistance; (15) providing a free access type floor in which support members can be easily mounted on a floor surface; (16) providing a multi-layered free access type floor which is easy to construct, remove and transfer; (17) providing a multi-layered free access type floor in which a separator has a drainage function; (18) providing a multi-layered free access type floor in which the adjustment of the space range defined by the height of the floor boards and a separator is possible; (19) providing a multi-layered free access type floor which can be firmly assembled and is superior in vibration resistance; (20) providing a multi-layered free access type floor which can protect apparatus and cables from water damage; (21) providing a multi-layered free access type floor which can be constructed on an uneven floor surface resulting in a secondary floor which is horizontally even; (22) providing a method for installing a free access type floor in which inking for positioning of support members is substantially not required even though floor panels and support members are separately formed; (23) providing a method for installing a free access type floor in which support members can be constructed with adhering them to a floor surface; and (24) providing a free access type floor which is easy to remove and transfer.

BRIEF DESCRIPTION OF THE DRAWINGS

This invention may be better understood and its numerous objects and advantages will becomes apparent to those skilled in the art by reference to the accompanying drawings as follows:

FIGS. 4(a) and 4(b) are a plan view and a front sectional view showing a support member 2, respectively.

FIG. 5 is a diagram showing the connection of adjacent floor boards with the support member 2.

FIGS. 6(a) and 6(b) are a plan view and a front view showing a flange bolt, respectively.

FIGS. 8(a) and 8(b) are a plan view and a sectional view showing the connection of adjacent floor boards with support members, respectively.

FIGS. 9(a) and 9(b) are a plan view and a front view showing a collar tube, respectively.

FIGS. 10(a) and 10(b) are a plan view and a front view showing another collar tube, respectively.

FIGS. 11(a) and 11(b) are a plan view and a front view showing another collar tube, respectively.

FIGS. 12(a) and 12(b) are a plan view and a front view showing another collar tube, respectively.

FIGS. 16(a) and 16(b) are a plan view and a sectional view showing an engagement of floor boards with support members.

FIGS. 18(a) and 18(b) are a plan view and a front view showing a floor board, respectively.

FIGS. 22(a) and 22(b) and FIGS. 23(a) and 23(b) are plan views and front views showing a buffer member in another spacer, respectively.

FIGS. 33(a) and 33(b) and FIGS. 34(a) and 34(b) are plan views and perspective views showing another engagement of support members with connecting means, respectively.

FIGS. 35 and 36 are plan views showing still other examples of the above described engagement.

FIGS. 37(a) and 37(b), FIGS. 38(a) and 38(b), FIGS. 39(a) and 39(b), FIGS. 40(a) and 40(b), and FIGS. 41(a) and 41(b) are plan views and perspective views showing other examples of the engagement of support members with connecting means, respectively.

FIGS. 51(a) and 51(b) are a plan view and a perspective view showing another engagement of a support member with connecting means, respectively.

FIG. 52 is a plan view showing another example of the above described engagement.

FIG. 53 is a front view showing another example of the above described engagement.

FIG. 54 is a plan view showing another example of the above described engagement.

FIGS. 55(a) and 55(b) are a plan view and a front view showing another example of the above described engagement, respectively.

FIG. 56 is a front view showing another example of the above described engagement.

FIGS. 57(a) and 57(b) are a plan view and a front view showing another example of the above described engagement, respectively.

DESCRIPTION OF THE PREFERRED EMBODIMENTS

The preferred embodiments of the present invention will be below described.

EXAMPLE 1

Figure 1:
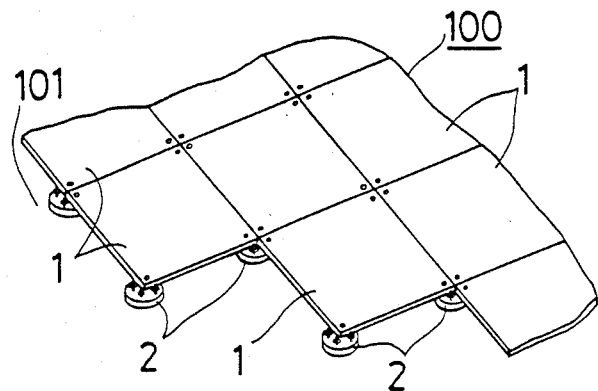
FIG. 1 is a partial perspective view showing a second floor 100 formed by the use of a free access type floor according to the present invention.
Figure 2:
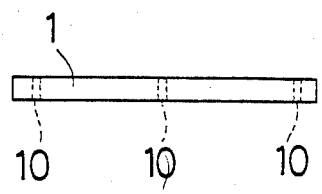
FIGS. 2 and 3 are a front view and a bottom view showing a floor board 1, respectively.
Figure 3:
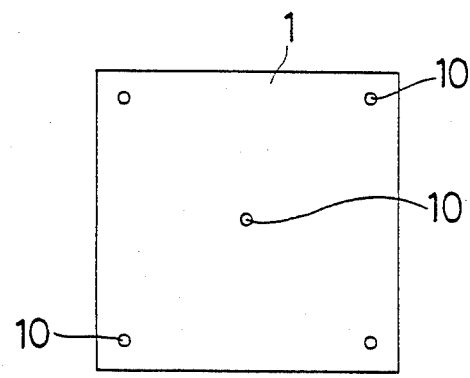

A free access type floor according to the present invention, as shown in FIGS. 1-3, comprises a plurality of floor boards 1, engaging members 10 provided at least each corner of said floor boards 1 and support members 2, which are adjustable in height, for closely connecting adjacent floor boards 1 through said engaging members 10. Said support members 2, as shown in FIGS. 4(a) and 4(b), are provided with a plurality of engaging means 20 detachably engageable with the adjacent engaging members 10 of the adjacent floor boards 1 on a single plane. As shown in FIG. 5, the distance A between the centers of the adjacent engaging members 10, 10 of the adjacent floor boards 1 is set so as to be larger than the distance B between the centers of engaging means 20, 20 of the support members 2 corresponding to said distance A. As a result, when each of the engaging members 10 is engaged with the engaging means 20, 20 of the support members 2 corresponding thereto, the floor boards 1 are closely connected to each other and are drawn toward each other until the a distance F between both floor boards approaches zero. The floor boards 1 are arranged in a closely connected manner on a single plane on the support members 2 through the engaging members 10 in this manner to form a secondary floor 100. Said secondary floor is laid on the original floor 101 in this manner. The engaging members 10 of the floor board 1 are composed of an engaging hole. The support member 2 comprises flange bolts 21 and a pedestal 23 in which said flange bolts 21 are fixedly screwed through flange nuts 22. The engaging members 20 of the support member 2, as shown in FIGS. 6(a) and 6(b), are composed of the flange bolt 21 which is engaged with said engaging hole 10 of the floor board. The outside size of the collar 211 is larger than the diameter of the engaging hole 10. The floor board 1 is moved up and down to correctly and firmly insert a bolt head 210 in the floor board-engaging hole 10 absorbing any uneven height of the floor surface by rotating the flange bolt 21 set on the support member 2 on the pedestal 23 relatively to the nut 22. Thus each of the floor boards 1 is adjusted in height and an equal floor level is achieved, after which the floor board 1 can be adhered to the support member 2. At the same time, since the bolt head 210 and the engaging hole 10 are subjected to a mutual pressing load due to the above described positional relation therebetween, the revolution of the bolt due to vibration of the floor board 1 and the like can be prevented, whereby the bolt can be prevented from becoming loose.

In order to secure the engagement of the engaging means 20 with the floor board-engaging hole 10 even more, it is recommended to use a split-, triangular-, rhombic-, guitaric-, or bellows-like shaped bolt 21 and the like and design the boards-engaging holes so as to correspond to the above described shape of the bolt 21.

EXAMPLE 2

Figure 7:
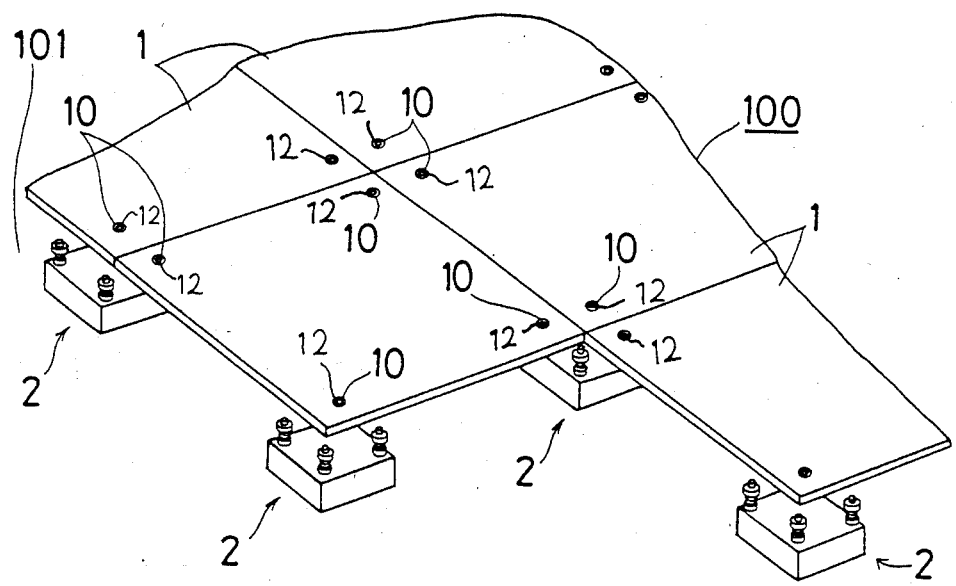
FIG. 7 is a partial perspective view showing a secondary floor formed by the use of another free access type floor according to the present invention.

A free access type floor according to the present invention may also be constructed as follows:

As shown in FIG. 7 and FIGS. 8(a) and 8(b), a collar tube 12 is placed in an engaging hole 10. The collar tube 12 is, as shown in FIGS. 9(a) and 9(b), provided with a collar 121 formed on one end face thereof and placed in the engaging hole 10, engaging the collar 121 with a lower face of the floor board 1.

The support member 2 comprises a solid irregular hexahedron-shaped pedestal 23 and four flange bolts 21. The pedestal 23 is mounted on the floor in correspondence to each corner of each of the floor boards 1. The pedestal 23 is provided with four nut portions 231, 231 ---, which are threaded on the internal periphery thereof, at the corners thereof. Each of the nut portions 231 is arranged so as to be positioned at each summit of a regular square seen on a plan view. The flange bolt 21 is provided with a collar 211 at the upper portion thereof and a screw thread at the lower portion thereof. Said nut portion 231 is screwed into this screw thread. The head 210 (the upper portion of the collar 211) of the flange bolt 21 is inserted into the collar tube 12. Therefore, the floor board 1 is supported under the condition that the corner portions of the floor board 1 are placed on the collars 211. The collar 121 of the collar tube 12 is placed between the collar 211 of the flange bolt 21 and the floor board 1.

A compression spring 24 is placed on the flange bolt 21 between the lower face of the collar 211 and the upper face of the pedestal 23. Said compression spring 24 pushes upward the flange bolt 21 as a whole and the collar 211 is pressed against a lower face of the floor board 1 through the collar 121 of the collar tube 12. As a result, there is no possibility that the bolt 21 becomes loose due to vibration and the like of the floor board 1.

The flange bolt 21 is provided with a threaded portion 212 on the upper face thereof, said threaded portion 212 being visible from the upper opening of the collar tube 12. The flange bolt 21 is moved in the axial direction by rotating a screw driver or the like engaged with said threaded portion 212 from the upper side of the floor board 1. Thus the height from the pedestal 23 to the collar 211 of the flange bolt 21 can be optionally changed and the height from the primary floor 101 to each corner of the floor board 1 can be changed. Accordingly, the uneven height of each floor board 1 can be absorbed and the secondary floor can be formed on a single plane.

The collar tube 12 is not limited to the one as shown in FIGS. 9(a) and 9(b). For example, as shown in FIGS. 10(a) and 10(b), clicks 122, 122 projecting downwardly to the outside may be formed at axissymmetrical positions on the middle portion of the periphery of the cylindrical portion. With such a construction, the collar tube 12 can be securely engaged with an engaging hole 10 of the floor board 1. In addition, as shown in FIGS. 11(a) and 11(b), the collar tube 12 may be constructed so that the cylindrical portion thereof may be tapered. With such a construction, the collar tube 12 is easily engaged with the engaging hole 10 and the engagement of the former with the latter can be secured. Furthermore, the collar tube 12 may be, as shown in FIGS. 12(a) and 12(b), provided with a split portion 123 parallel to the axis shaftline formed in a cylindrical portion and the collar 121 thereof. With such a construction, the collar tube 12 has elasticity in the radial direction, thereby being easily detached from and surely engaged with the engaging hole 10.

Figure 13:
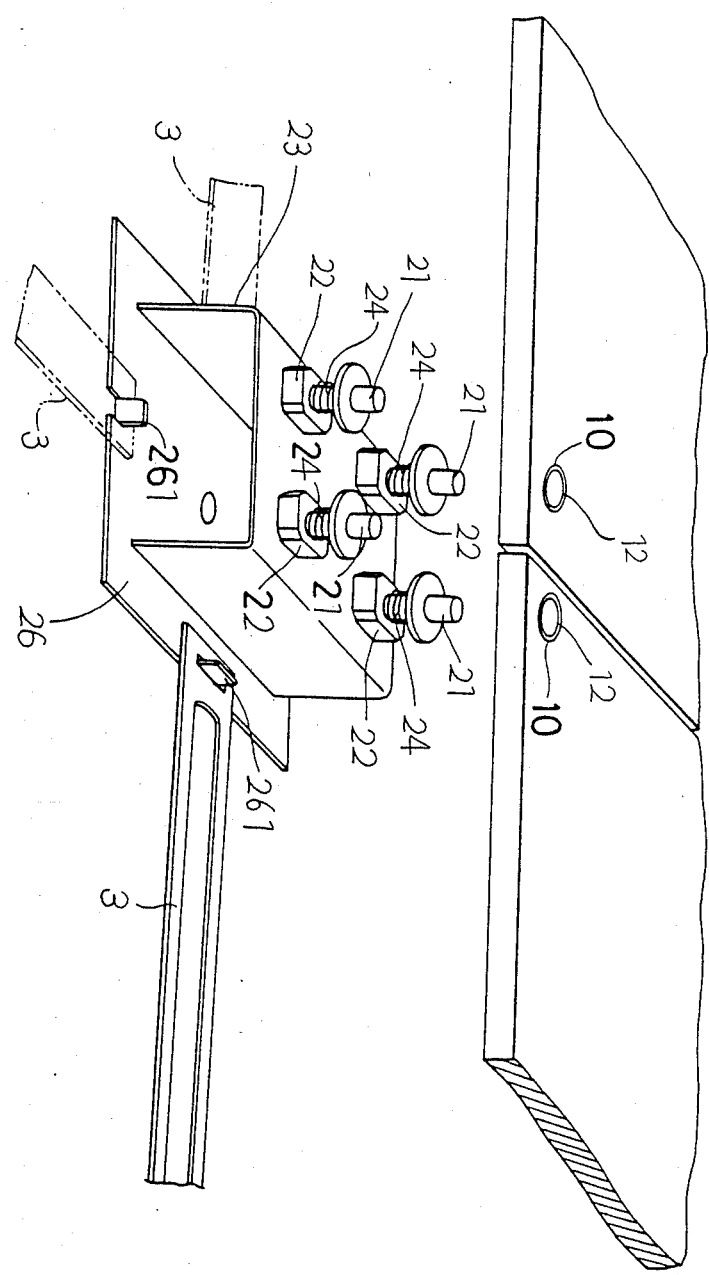
FIG. 13 is a perspective view showing another support member.
Figure 14:
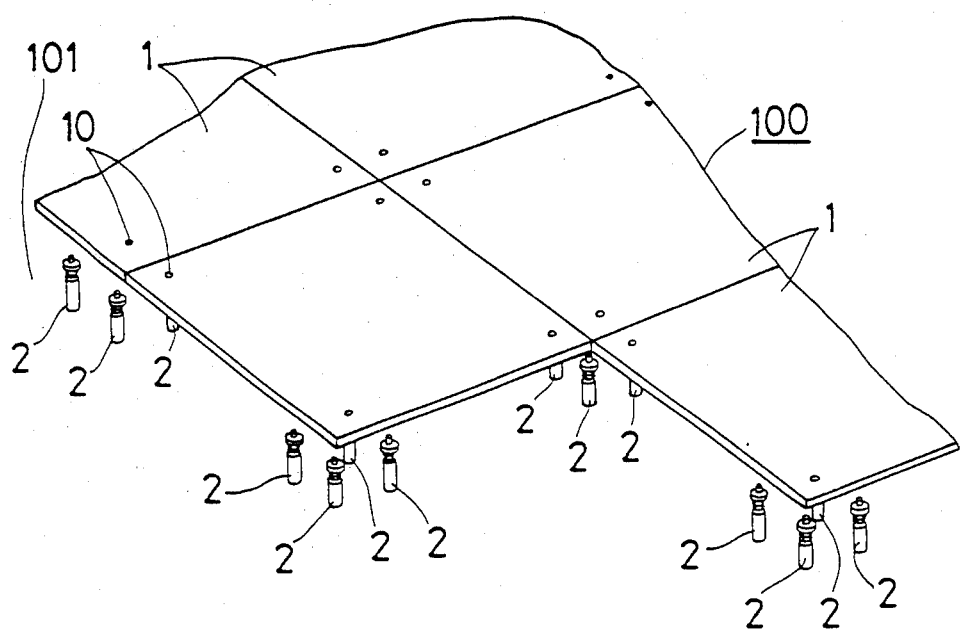
FIG. 14 is a partial perspective view showing one example of a secondary floor formed by the use of another free access type floor according to the present invention.
Figure 15:
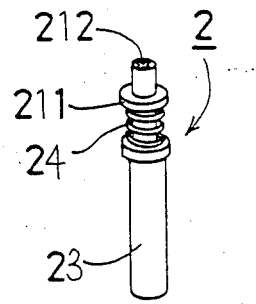
FIG. 15 is a perspective view showing a support member.

The pedestal 23 of the support member 2 is not limited to an irregular hexahedronal one. It may be constructed in a columnar shape. In addition, the pedestal 23 need not always be solid. It may be, as shown in FIG. 13, constructed so that a hollow pedestal 23 comprising only an upper face, and the opposite two side faces may be mounted on a bottom plate 26 mounted on the floor. In this preferred embodiment, four nuts 22 are mounted on the upper face of the pedestal 23 in a regular square shape and the flange bolts 21 are screwed into the nuts 22. A compression spring 24 is placed on the flange bolt 21 and the collar tube 12 engaged with the engaging hole 10 of the floor board 1 is engaged with the head of said flange bolt 21 in the same manner as in the above described example. The bottom plate 26 is provided with projections 261 formed by cutting and vertically bending upward the center of each edge thereof, each of said projections 261 being engaged with one end of the connecting means 3. The other end of each of the connecting means 3 is engaged with the projection 261 formed in the bottom plate 26 of the adjacent support member 2. Accordingly, the bottom plate 26 is fixed by the connecting means 3.

EXAMPLE 3

A support member 2 of a free access type floor according to the present invention may be, as shown in FIG. 14, FIG. 15 and FIGS. 16(a) and 16(b), composed of a pedestal 23 composed of a nut member, a flange bolt 21 engaged with said pedestal 23 and a compression spring 24 placed on said flange bolt 21 between the pedestal 23 and a collar 211 of the flange bolt 21. The pedestal 23 is mounted on the floor 101. The floor board 1 is provided with engaging holes 10 at corners thereof. The floor board 1 is engaged with the head of the flange bolt 21 through the engaging hole 10 which is on the collar 211. The bolt 21 is provided with a thread 212 formed at the top end thereof, the bolt 21 itself being moved relatively to the pedestal 23 by rotation, thereby changing the height of the collar 211 relative to the floor 101. The compression spring 24 energizes the bolt 21 as a whole upwardly by pushing up the collar 211 to absorb vibrations and the like of the floor board 1. As a result, the bolt 21 can be prevented from becoming loose.

It is desirable that the compression spring 24 be made of a metal in view of strength, durability and the like. In addition, in the case where, for example, piano wires are used, it is desirable that their diameter be 0.5–2.0 mm so that height can easily be adjusted and the floor board be securely fixed.

The bolt 21 is rotated so that the upper portion of the collar 211 of the bolt 21 is placed in the engaging hole 10 of the floor board 1, thereby moving the floor board 1 up and down to adjust any uneven height of the floor surface. Thus the floor boards 1 can be arranged on a single plane in a closely connected manner to form a secondary floor 100. This secondary floor 100 is laid above the primary floor 101 with a suitable space therebetween.

EXAMPLE 4

Figure 17:
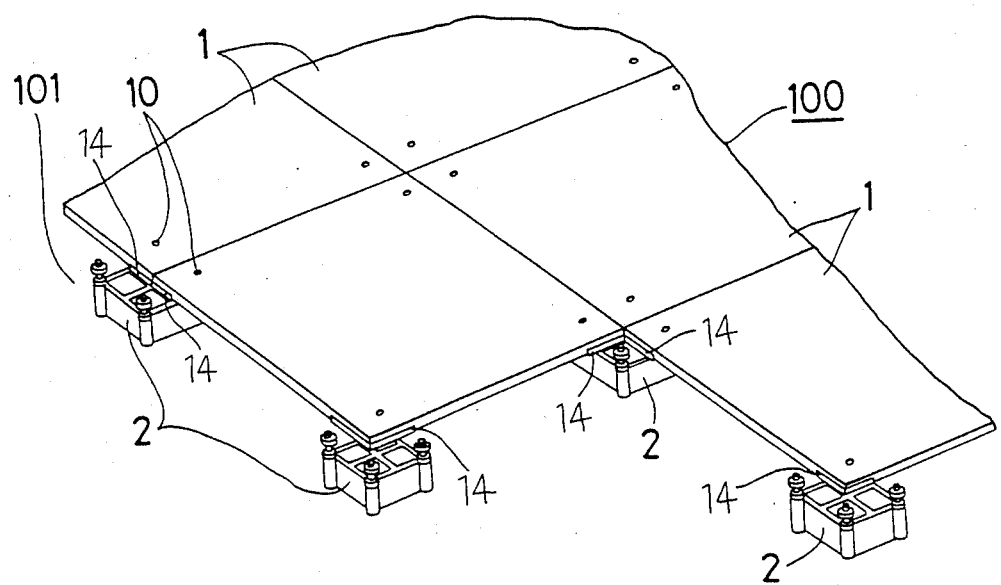
FIG. 17 is a partial perspective view showing a secondary floor formed by the use of a free access type floor according to the present invention.

Another preferred embodiment of a free access type floor according to the present invention comprises as shown in FIG. 17, a plurality of floor boards 1, support members 2 for fixing said floor boards 1 in a closely connected manner and buffer members 14 engaging with the floor boards 1 and the support members 2 when connected. The floor board 1 is provided with an engaging means, for example, an engaging hole 10, at at least each corner thereof for engaging with the support member 2. The floor boards 1 are arranged and drawn to each other by the support members 2 through the engaging holes 10 to form a secondary floor 100. This secondary floor 100 is laid above the primary floor 101 with a suitable space therebetween.

Figure 19:
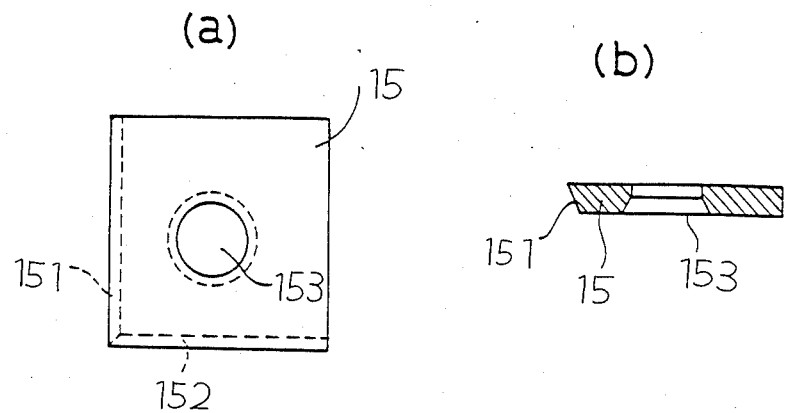
FIGS. 19(a) and 19(b) are a plan view and a cross sectional view showing a spacer, respectively.

As shown in FIGS. 18(a) and 18(b), the floor board 1 is provided with engaging holes 10, which serve as engaging members, at the corners thereof. In addition, the floor board 1 is provided with spacers 15 covered with buffer members 14 at the corners on the back face thereof. As shown in FIGS. 19(a) and 19(b), the spacers 15 are formed of a square thin plate and provided with holes 153 as engaging holes 10 at the center thereof. These spacers 15 are arranged concentrically with the engaging holes 10 relatively to the back face of the floor board 1, one corner of the spacer 15 being fixed with adhesives and the like so as to correspond to the corner of the floor board 1. Two end faces 151, 152 forming the corner corresponding to the corner of the floor board 1 are tapered so as to be inclined toward the center of the spacer 15.

The spacer 15 is covered with the buffer member 14. The buffer member 14 is extended to the end face of the corner of the floor board 1 and said end faces are brought into contact with each other. The buffer member 14 is provided with a similar engaging hole 141 aligning with the hole 153 of the spacer 15 at the central portion thereof.

Figure 20:
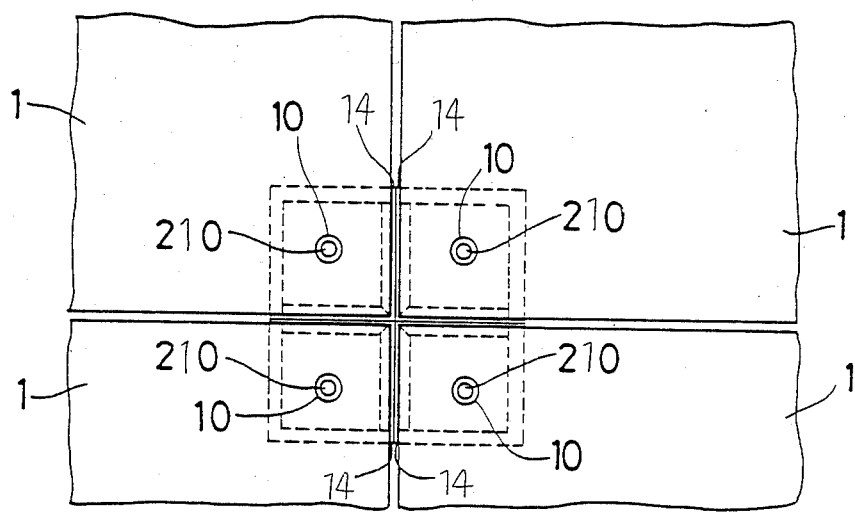
FIG. 20 is a plan view showing the connection of adjacent floor boards with a support member.
Figure 21:
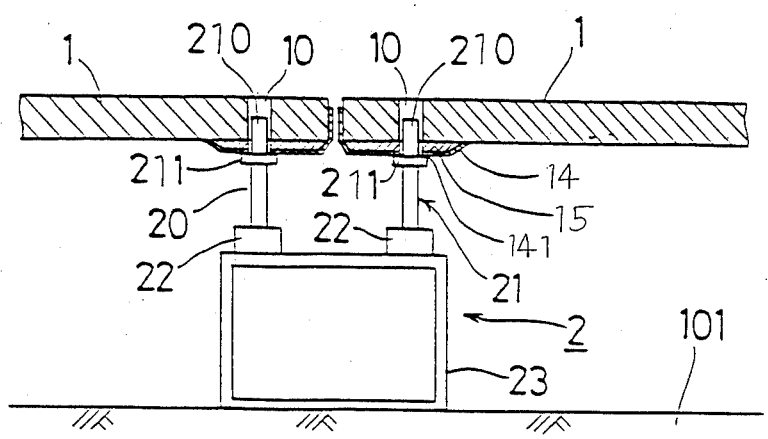
FIG. 21 is a vertical sectional view showing the connection shown in FIG. 20.

As shown in FIGS. 20 and 21, the support member 2 comprises a plurality of flange bolts 21 (four flange bolts) mounted on the pedestal 23 through the nuts 22 by means of screws, respectively, said flange bolt 21 forming an engaging means 20 for the floor board 1. The head 210 of the flange bolt 21 is passed through the engaging hole 141 of the buffer member 14 and the hole 153 of the spacer 15 to engage the flange bolt 21 with the engaging hole 10 of the floor board 1. In addition, the floor board 1 is moved up and down to engage the collar 211 of the flange bolt 21 with the buffer member 14 by rotating the flange bolt 21 on the pedestal 23 relatively to the nut 22, an extended portion of the buffer member 14 covering the spacer 15 between the end faces of the adjacent floor boards 1, whereby the bolt head 210 can be secured in the engaging hole 10 of the floor board 1, absorbing any uneven height of the floor surface.

FIGS. 22(a) and 22(b) show another example of the spacer 15. In this preferred embodiment, an upwardly extending cylinder 154 is formed around the hole 153 which passes through at the center of the spacer 15, a thread being formed on the internal surface of said cylinder 154. Moreover, the adjacent two tapered end faces 151 and 152 can be engaged with an end face of a corner of the floor board 1.

Figure 22:
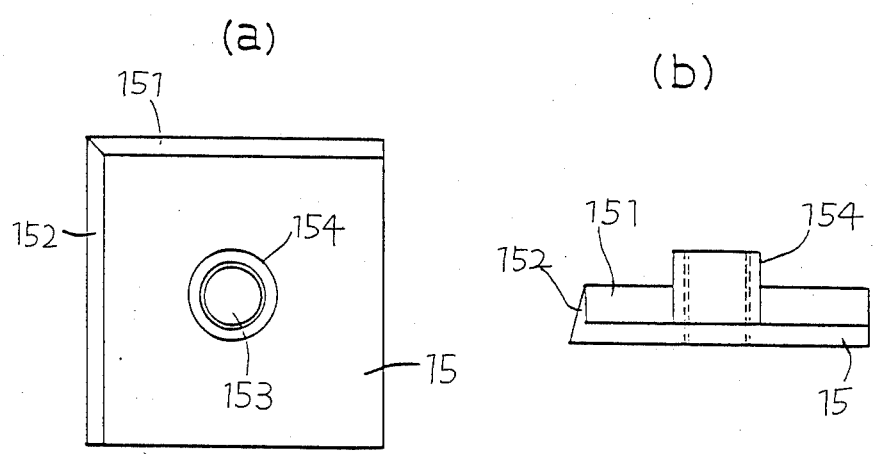

FIGS. 23(a) and 23(b) show a case in which the cylinder 154 extends in a downward direction (contrary to the case in which the cylinder 154 was formed around the hole 153, which passes through the center of the spacer 15 and extends in an upward direction, as shown in FIGS. 22(a) and 22(b)) the construction, other than the cylinder 154, is the same as in the preferred embodiment as shown in FIG. 22.

In the preferred embodiment as shown in FIGS. 22 and 23, since a corner of the floor board is engaged with an end face of a corner formed by two adjacent sides of the spacer 15, the spacer 15 is easy to position in the floor board, whereby the spacer can be simply installed in the floor board.

EXAMPLE 5

Figure 24:
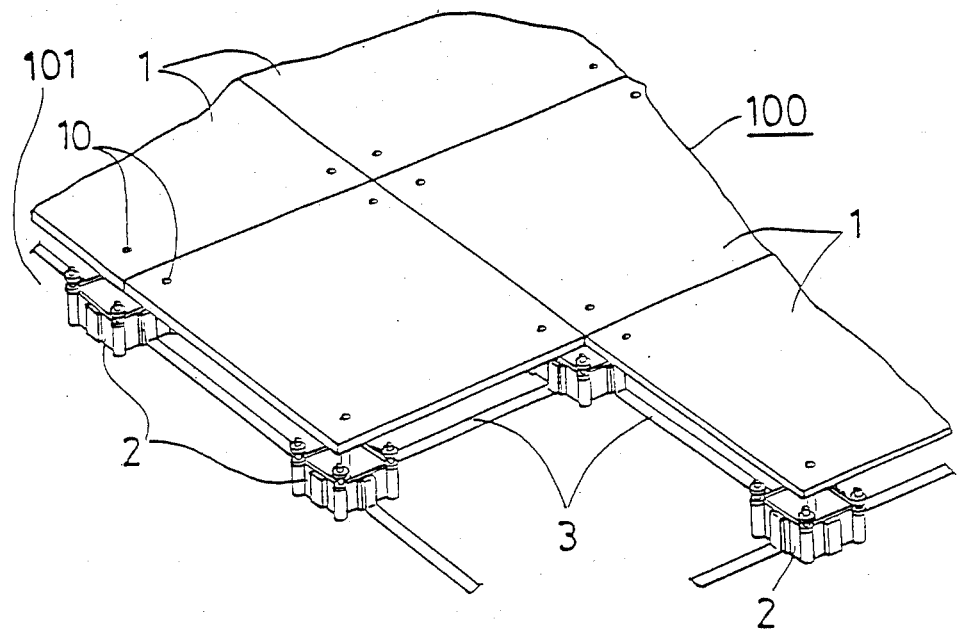
FIGS. 24 and 26 are partial perspective views showing another free access type floor according to the present invention.

FIG. 24 shows another preferred embodiment of a free access type floor according to the present invention. In this preferred embodiment, a free access type floor comprises a plurality of a floor panels 1 and support members 2 for supporting said floor panels 1 in a closely connected manner on a primary floor 101. The adjacent support members 2 are detachably connected to each other by means of a connecting means 3. Since the support members 2 are connected to each other by means of a connecting means 3, in order to lay all of the support members 2 at the appointed positions it is only necessary to connect them in turn by means of the connecting means 3 if the position and laying direction of the support member 2 to be laid first on the primary floor 101 are determined. In order to more securely position the support members 2 it is desirable that the connecting means 3 be brought into contact with the primary floor 101.

Figure 25:
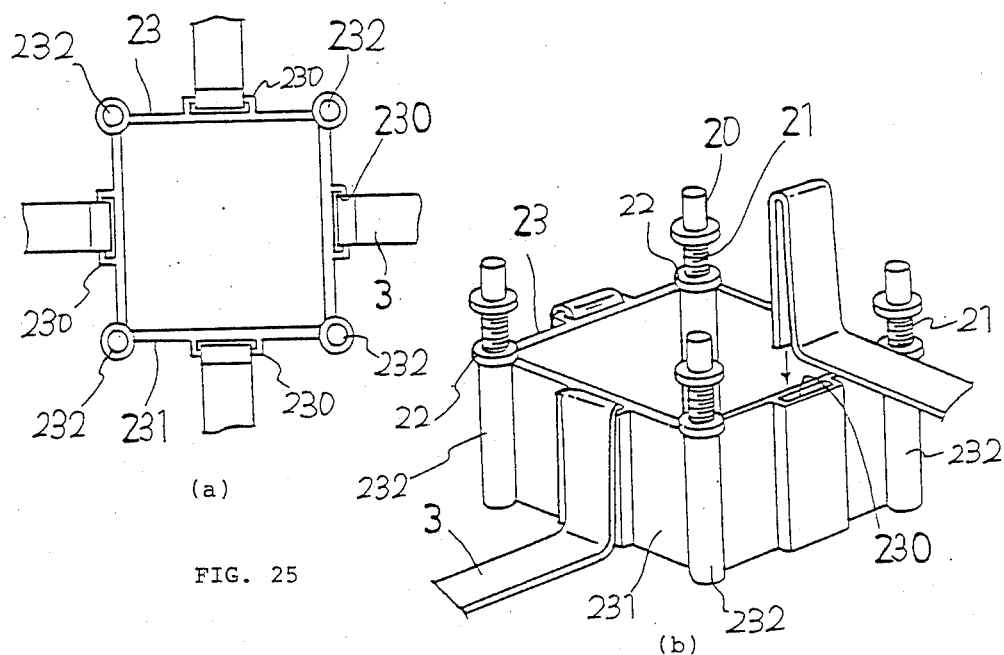
FIGS. 25(a) and 25(b), and FIGS. 27(a) and 27(b) are plan views and perspective views showing an engagement of a floor panel with a connecting means.

The support member 2, as shown in, for example, FIGS. 25(a) and 25(b), comprises a pedestal 23 and a plurality of engaging means 20, such as flange bolts 21, mounted on said pedestal 23 through flange nuts 22. These engaging means 20 are detachably engaged in, for example, the adjacent engaging holes 10 of the adjacent floor panels on one plane to support the floor panels 1 in a closely connected manner, thereby forming a secondary floor 100 on the primary floor 101. In particular, in the case where the engaging means 20 is composed of the flange bolt 21, the floor panel 1 is moved up and down by rotating the bolt 21 relatively to the nut 22 on the pedestal 23 to firmly and accurately insert the head of the bolt 21 in the engaging hole 10 of the floor panel 1 absorbing any uneven height of the floor surface. The flange nut 22 is engaged with a support portion 232 formed at each corner of the pedestal 23. In the case where it is desirable to divide the space between the floor panel 1 and the primary floor 101 into a space for power cables and a space for signal cables, a cable separator panel (not shown) is suitably mounted on the pedestal 23 through this engaging means 20. This pedestal 23 is provided with engaging members of the connecting means 230 composed of an engaging hole on four sides thereof and connected to each other by the connecting means 3 composed of a connecting member and the like detachably connectable in both end bent portions. It is unnecessary to engage the connecting means 3 with the engaging member of the connecting means 230 of the pedestal 23 with high accuracy. Both the connecting means 3 and the engaging member of the connecting means 230 of the pedestal 23 can be suitably adjusted by known means and methods after the completion of the connection of the pedestals 23 among themselves.

Figure 26:
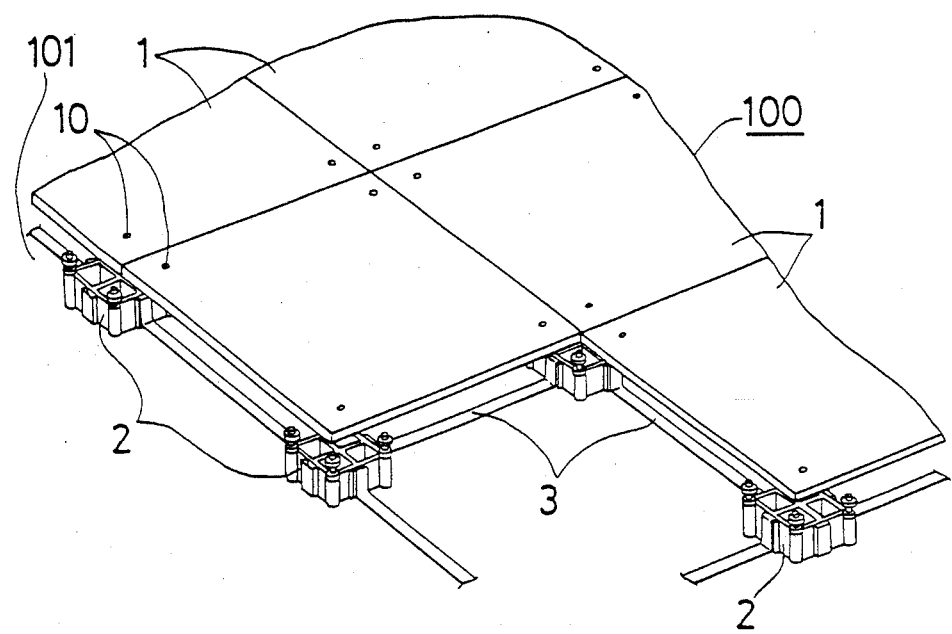
Figure 27:
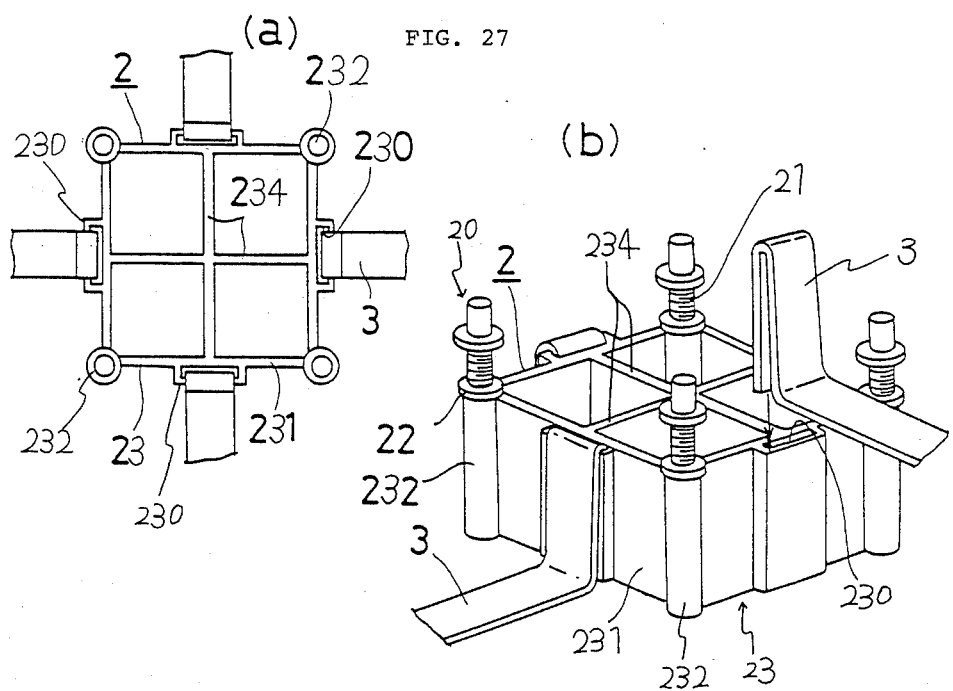
Figure 28:
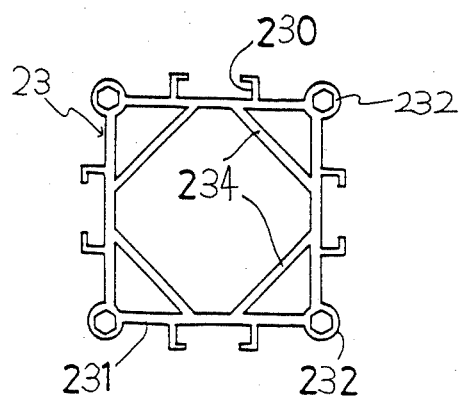
FIGS. 28, 29 and 30 are plan views showing another support member, respectively.
Figure 29:
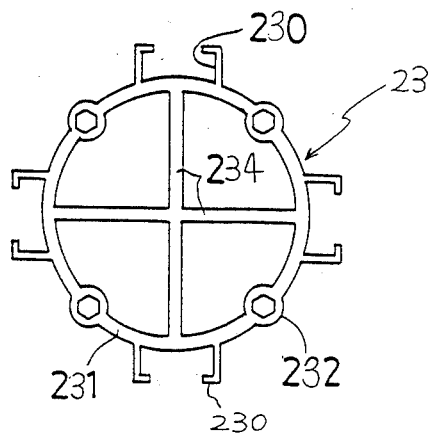
Figure 30:
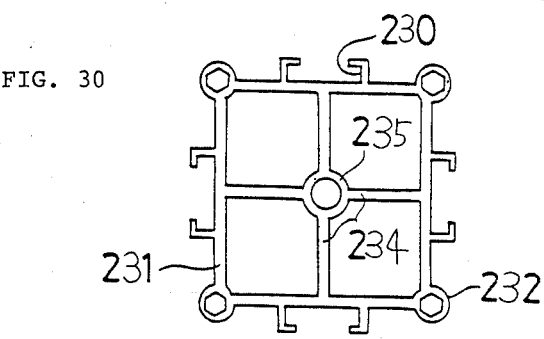

The pedestal 23 is formed of a thin frame member 231 in order to make it as light weight as possible. Said thin frame member 231 is integrally provided with said engaging member 230 and a support portion 232 of said engaging means 20. Since this frame member 231 is constructed to be as thin as possible, in order to prevent the dimensions from changing during construction, the frame member 231 can be provided with a reinforcing rib 234 therein if desired, as shown in FIGS. 26 and 27. This reinforcing rib 234 is not particularly limited in shape and construction. Any design which can withstand transformation due to stress from the frame member 231, such as one in which the opposite sides (in particular back faces of the engaging member of the connecting means 230) are connected crosswise, as shown in FIGS. 27(a) and 27(b), and one in which the sides forming angles are connected to each other, as shown in FIG. 28, can be adopted. A columnar frame member 231 may be provided with a similar reinforcing rib 234, as shown in FIG. 29. Since the frame member 231 is subjected to relatively strong inward stress toward the engaging member of the connecting means 230, it is desirable that the reinforcing rib 234 be provided in the form of connecting back faces of the engaging member of the connecting means 230. In order to increase the strength of the reinforcing rib 234 itself, it is also recommended to provide a reservoir in the central cross portion 235 in a hollow cylindrical shape, as shown in FIG. 30.

Figure 31:
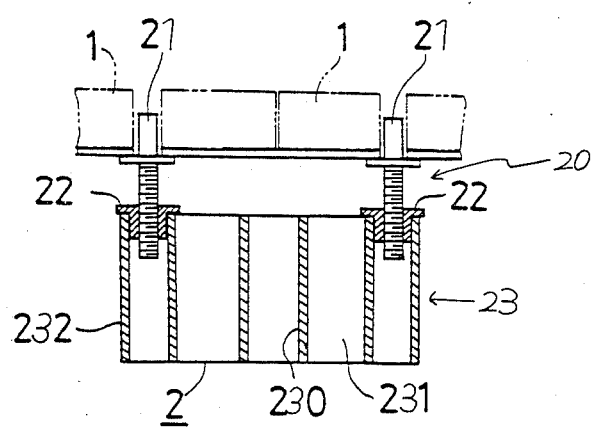
FIG. 31 is a front sectional view showing the condition of a flange bolt set in a pedestal.

A supporting member of the engaging means 232 of said frame member 231 is, s shown in FIG. 31, formed of a cylindrical member having a hollow cavity with a polygonal, for example, hexagonal, section vertical to an axis shaft line. The flange nut 22 having a similar polygonal cross section is inserted into this cylindrical member-supporting member 232, the flange bolt 21 screwed into this nut 22. Thus the flange bolt 21 is supported by the cylindrical member-supporting member 232 of the frame member 231. This frame member 231 is composed of, for example, deformed extruded aluminium cut in round slices of a suitable length (40 mm, 80 mm, 120 mm and the like) and then subjected to processing.

Figure 32:
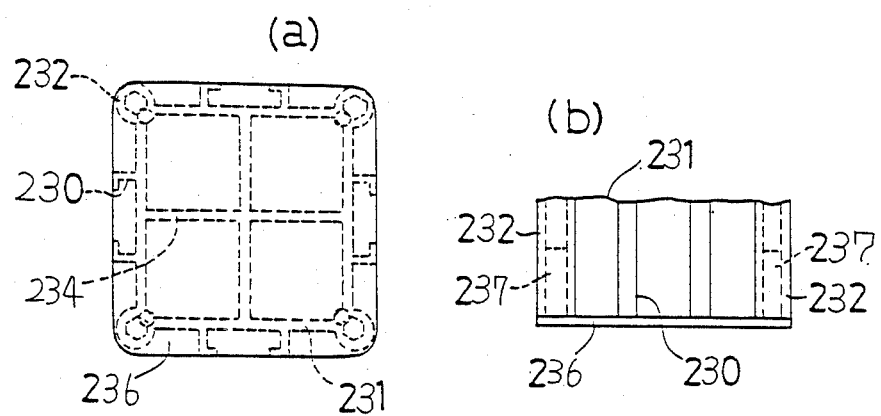
FIGS. 32(a) and 32(b) are a bottom view and a front view showing a cover plate mounted on a bottom surface of the pedestal, respectively.
Figure 33:
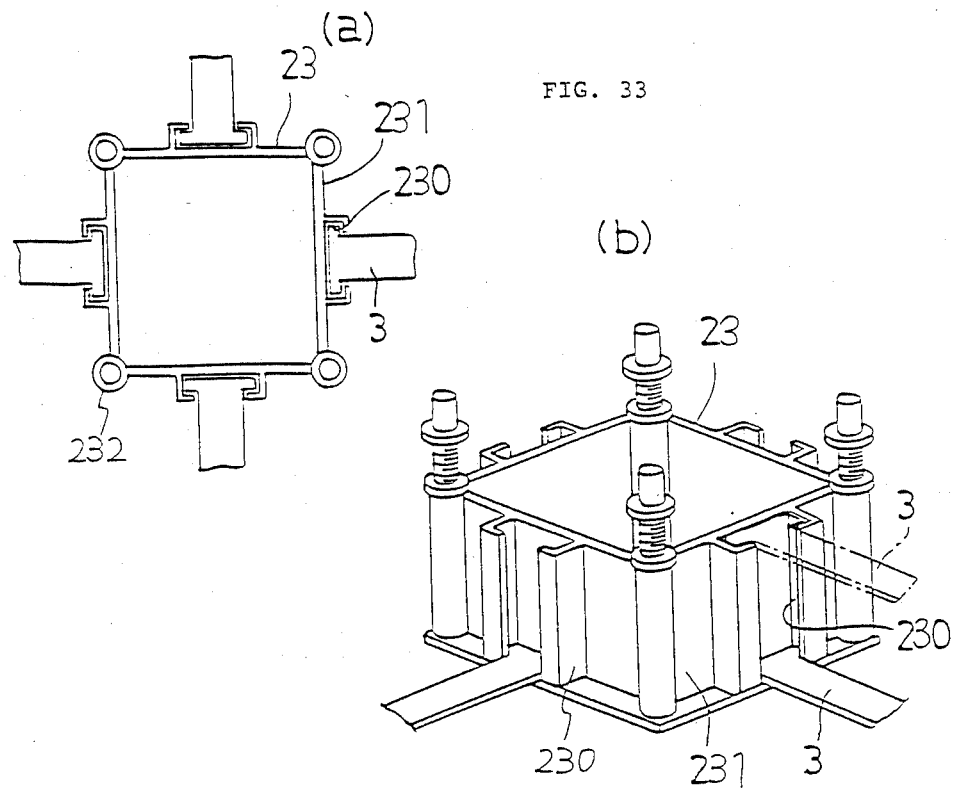

In the case where there is a possibility that the pedestal 23 is so light that it rises when laid on the floor 101, it can be mounted on the floor surface by means of glue or an adhesive. To this end, a cover plate 236 is mounted on the bottom of pedestal 23 by spot welding or the like, as shown in FIG. 32(a). This cover plate 236 is mounted on the floor on which glue or the like is applied. The cover plate 236 can be, as shown in FIG. 32(b), detachably mounted on the pedestal 23 also by introducing supporting rods 237 standing at four corners thereof into the hollow cavities of said supporting member of the engaging means 232. These supporting rods 237 are provided at at least two corners of the cover plate 236.

Figure 35:
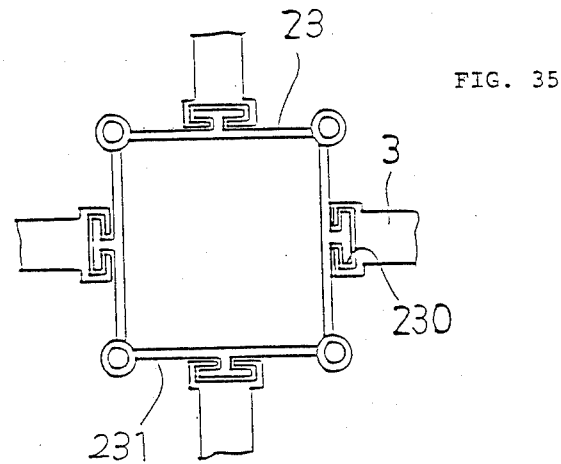
Figure 37:
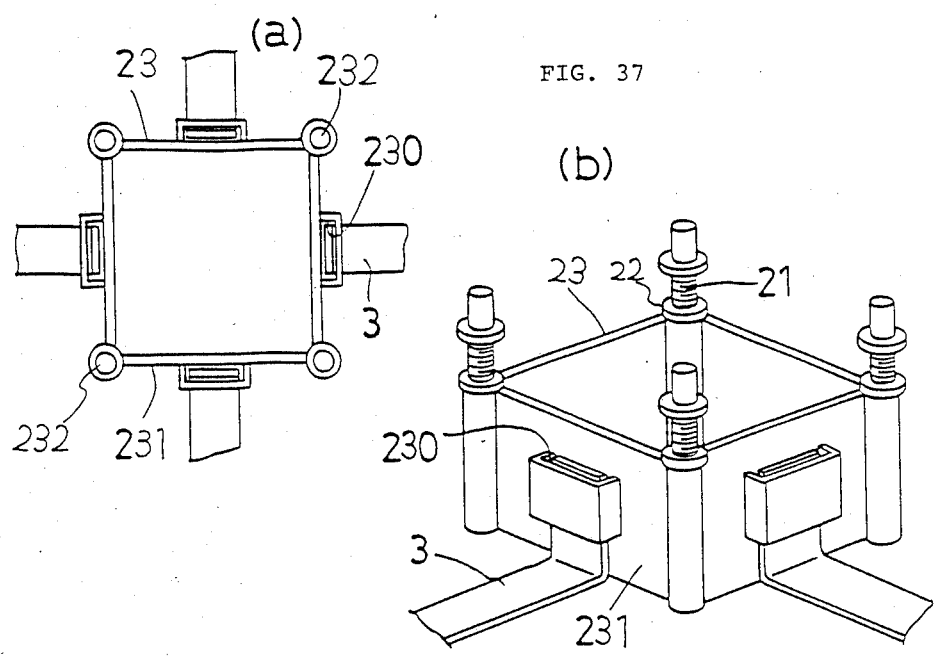
Figure 38:
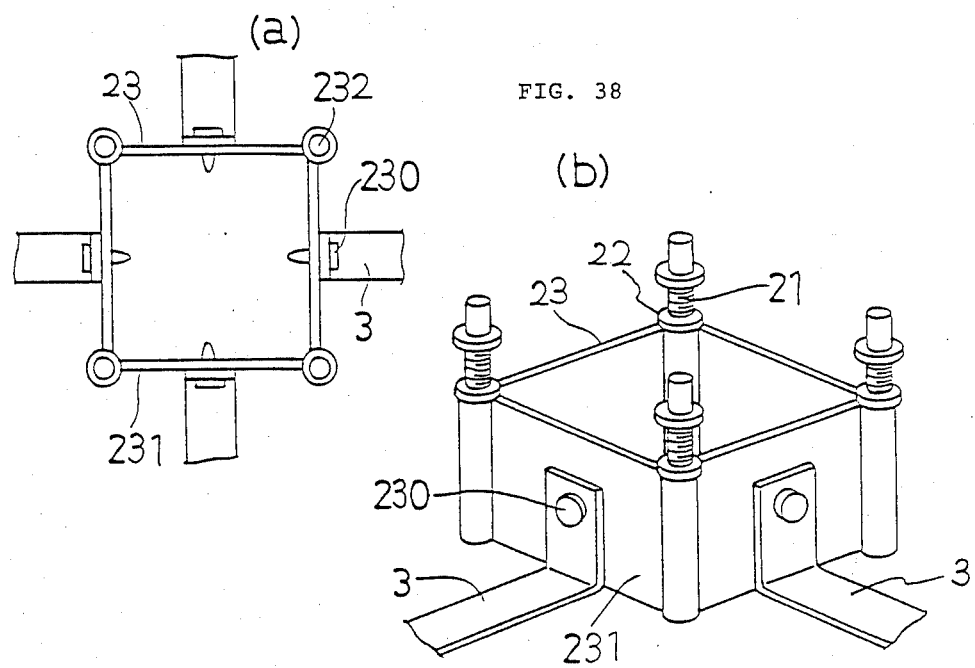
Figure 40:
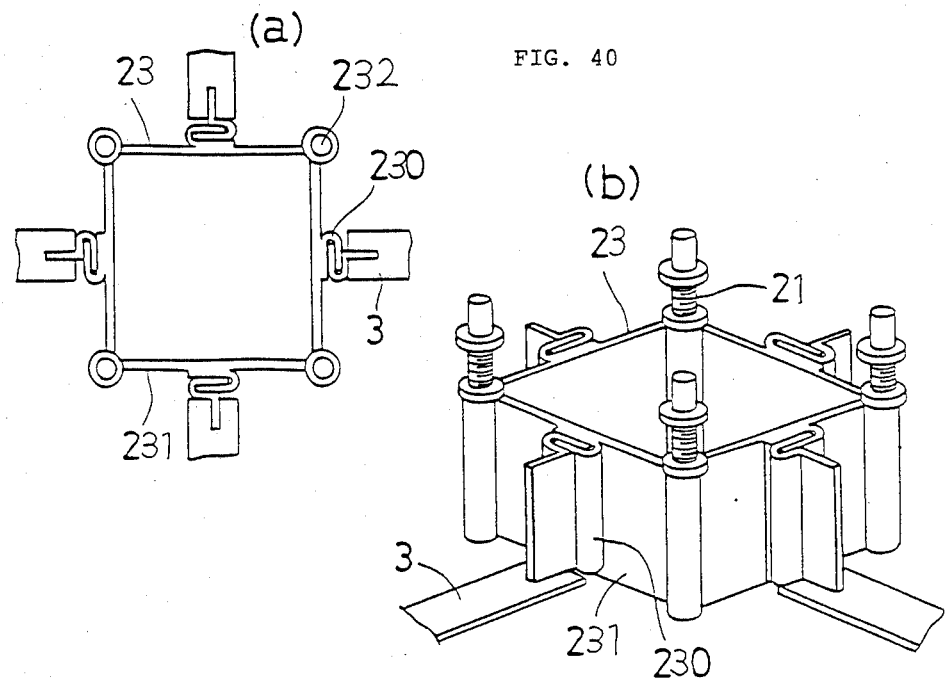
Figure 42:
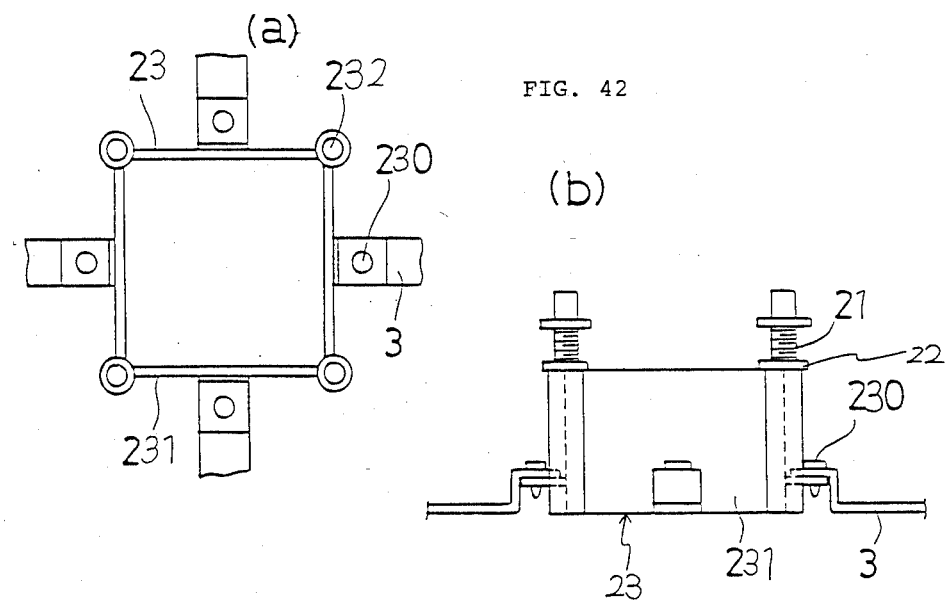
FIGS. 42(a) and 42(b) are a plan view and a front view showing still another example of the above described engagement, respectively.
Figure 43:
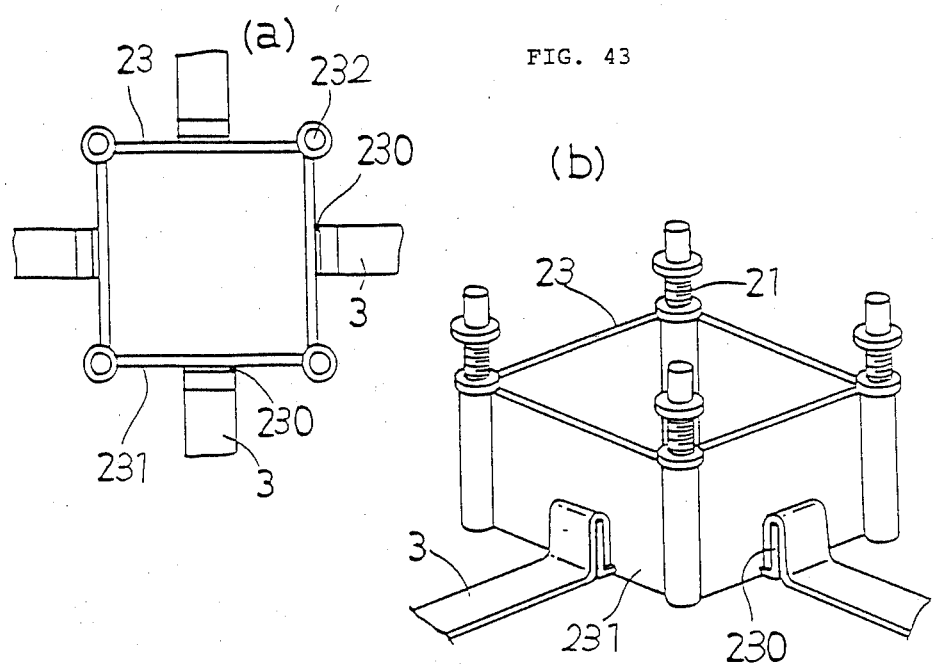
FIGS. 43(a) and 43(b), and FIGS. 44(a) and 44(b) are plan views and perspective views showing other examples of the engagement of support members with connecting means, respectively.
Figure 44:
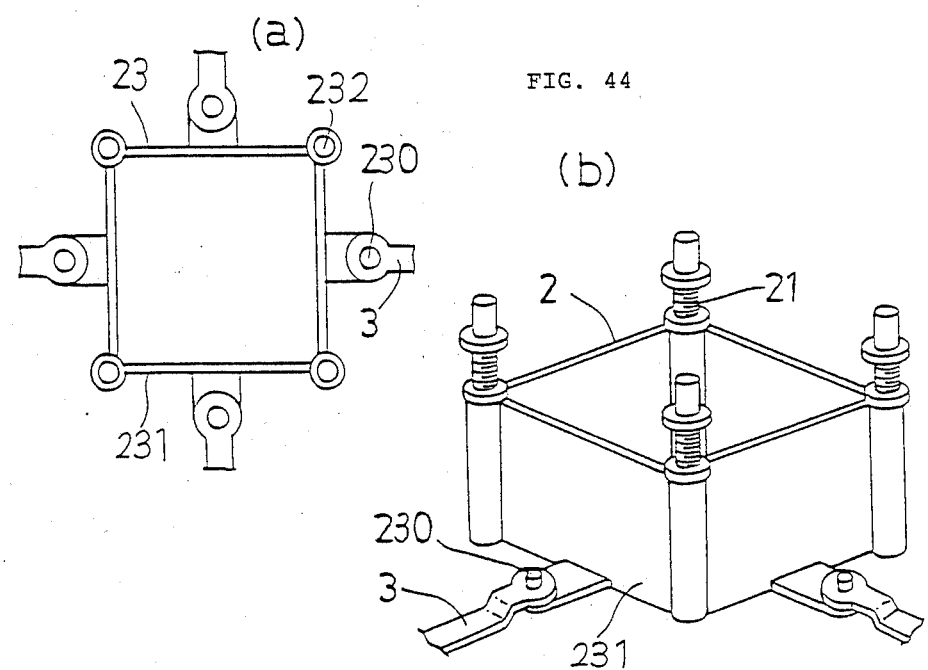
Figure 45:
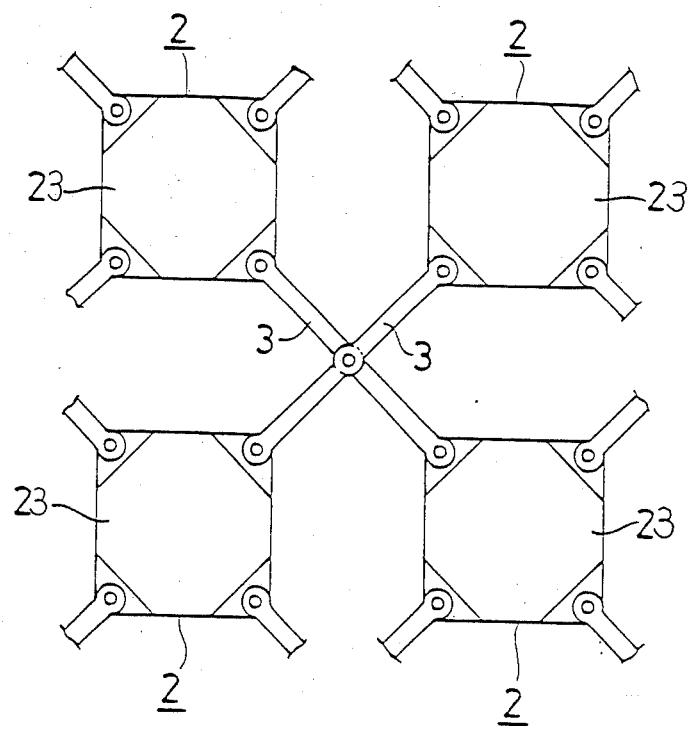
FIG. 45 is a plan view showing still another example of the above described engagement.
Figure 46:
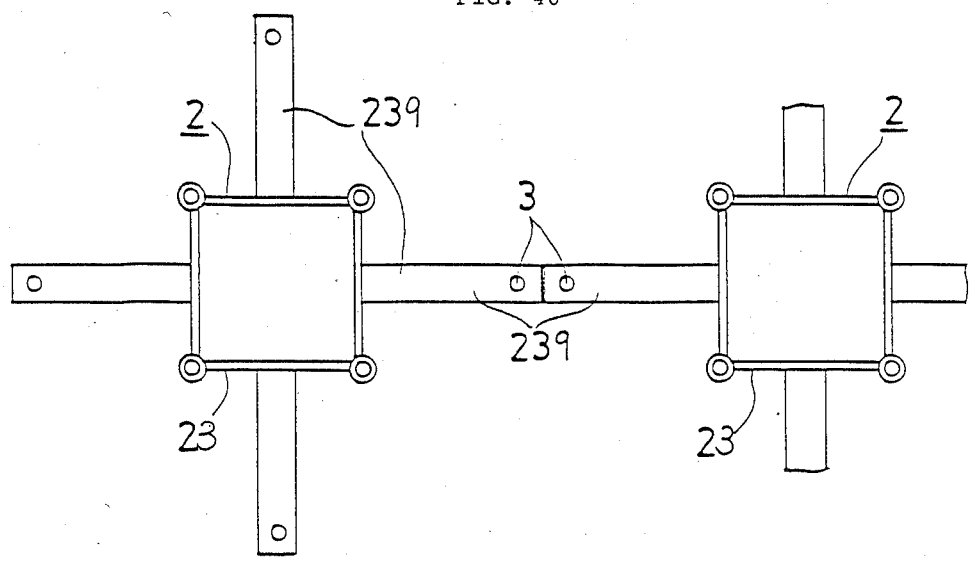
FIGS. 46(a) and 46(b), and FIGS. 47(a) and 47(b) are plan views and perspective views showing other examples of a support member and connecting means.
Figure 46:
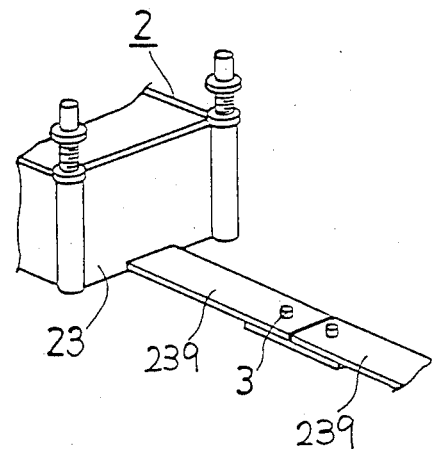
Figure 47:
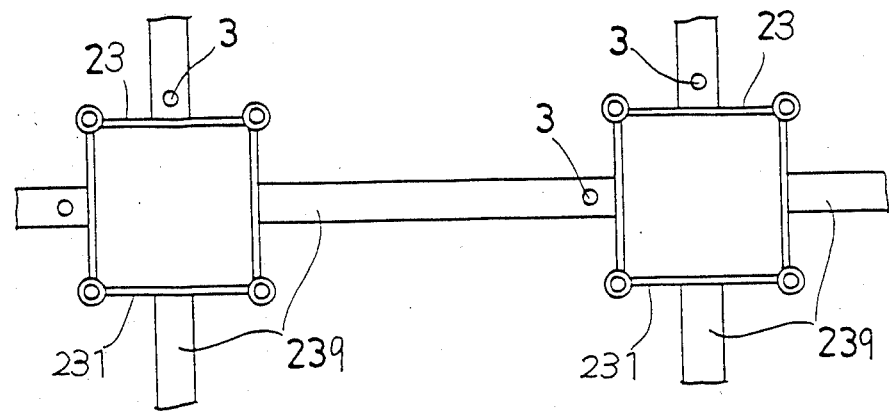
Figure 47:
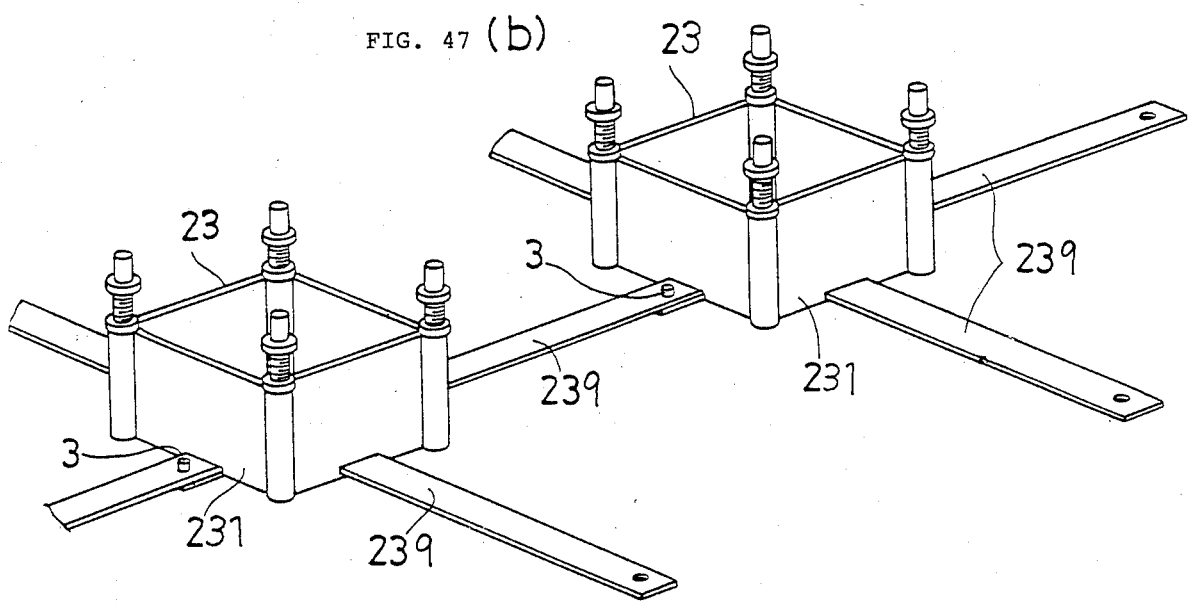

The pedestal 23 may be engaged with the connecting means 3 in the following manners:

The engaging member of the connecting means 230 is composed of a notched hole into which the T shaped end portion of the connecting means 3 is inserted, whereby the pedestal 23 can be engaged with the connecting means 3 in the lower portion of the frame member 231, as shown in FIGS. 33(a) and 33(b) and FIGS. 34(a) and 34(b); the notched hole positioned at the end portion of the connecting means 3 is engaged with the T shaped engaging member of the connecting means 230 mounted on a wall surface of the frame member 231, as shown in FIGS. 35 and 36; the L shaped end portion of the connecting means 3 is engaged with an engaging hole of the engaging member of the connecting means 230, as shown in FIG. 37; the L shaped end portion of the connecting means 3 is fixed by means of the engaging member 230 which is a clip on the wall surface of the frame member 231, as shown in FIGS. 38(a) and 38(b) and FIGS. 39(a) and 39(b); the end semiannular connecting member of the connecting means 3 is engaged with a semiannular engaging member 230 of the frame member 231, as shown in FIGS. 40(a) and 40(b) and FIGS. 41(a) and 41(b); the end portion of the connecting means 3 is connected with a horizontally pro-ejecting piece of the pedestal 23 by means of a clip type engaging member 230, as shown in FIGS. 42(a) and 42(b); the U shaped end portion of the connecting means 3 is engaged with the L shaped engaging member 230 of the pedestal 23, as shown in FIGS. 43(a) and 43(b); the projection-like engaging member 230 of the pedestal 23 is inserted into the engaging hole of the connecting means 3, as shown in FIGS. 44(a) and 44(b); pedestals 23 adjacent to each other in a diagonal line are connected by means of the connecting means 3, as shown in FIG. 45; the pedestal 23 composing the support member 2 has connecting arms 239 extending from four sides and the ends of the connected arms 239 of the adjacent pedestals 23 and detachably inter-connected by the connecting means 3, as shown in FIGS. 46(a) and 46(b); and the pedestal 23 has connecting arms 239 extending on two sides and connecting arms 239 extending from the adjacent pedestal 23 which are detachably connected to said connecting arms 239 by means of a connecting means 3 extending on the other two sides, as shown in FIGS. 47(a) and 47(b).

It goes without saying that the shoring 21 is not limited to the square pillar-shaped one described herein. Polygonal and column-shaped shorings and the like may be used. Also a hollow cylindrical member may be used.

EXAMPLE 6

Figure 48:
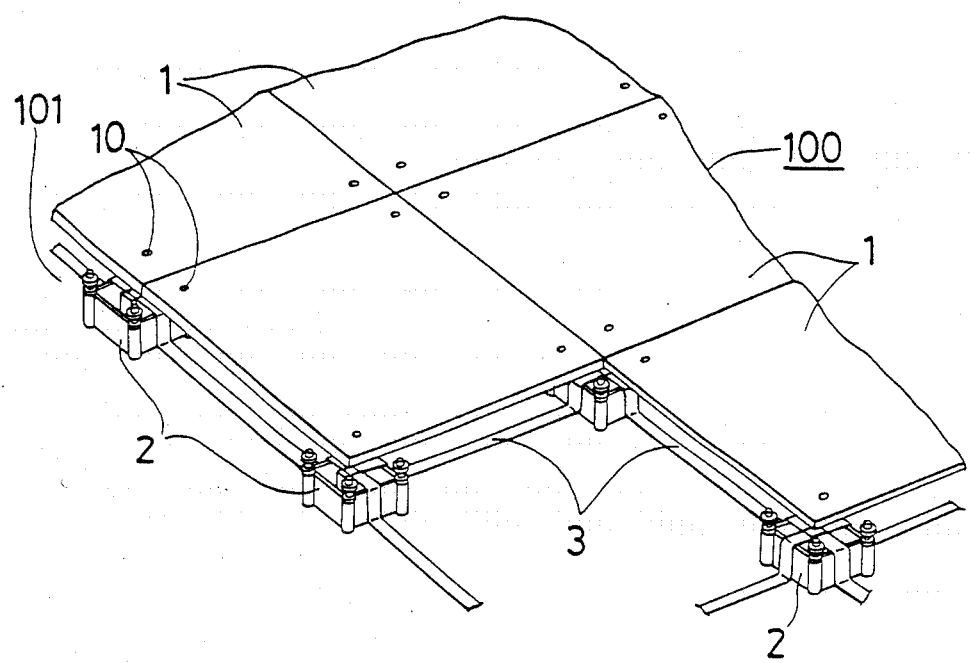
FIG. 48 is a partial perspective view showing another free access type floor according to the present invention.
Figure 49:
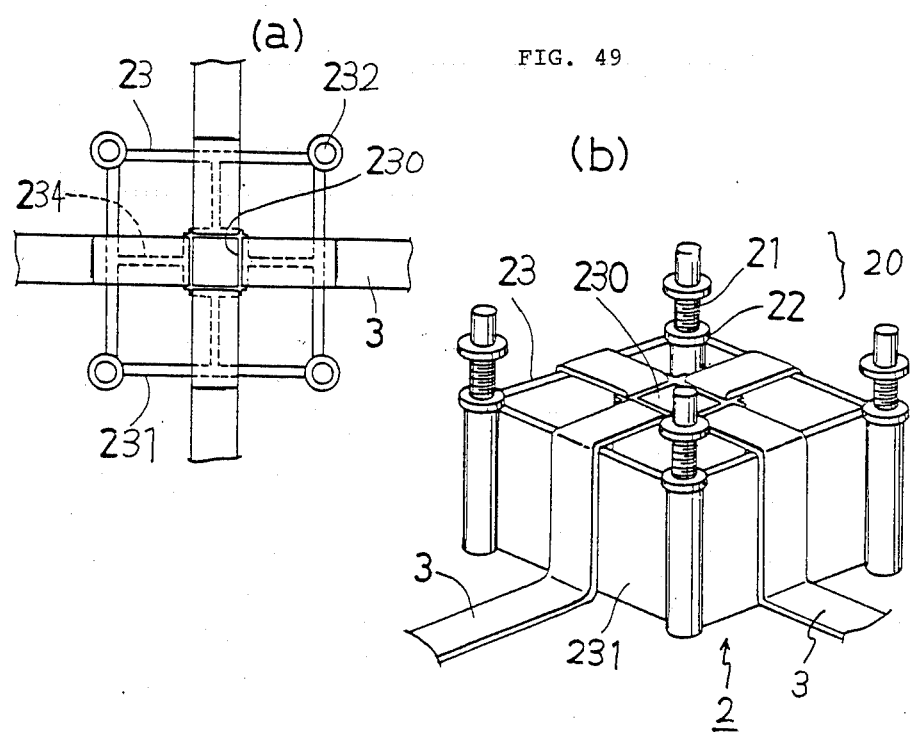
FIGS. 49(a) and 49(b) are a plan view and a perspective view showing another engagement of a support member with a connecting means, respectively.

A free access type floor according to the present invention may be provided with an engaging member of the connecting means 230 at the center of a pedestal 23 of the support member 2. As shown in FIGS. 48 and 49, this engaging member 230 is mounted on the support member 2 by means of a rib 234. A connecting means 3 composed of a connecting member, which is detachably engageable at both bent ends thereof, is engaged with this engaging member 230, whereby the pedestals of the support members 2 are connected with each other. Also in this case, it is unnecessary to accurately engage the connecting means 3 with the engaging member 230. Both the connecting means 3 and the engaging member 230 can be adjusted by known measures and methods after the connection of the pedestals 23 between themselves is completed.

Figure 50:
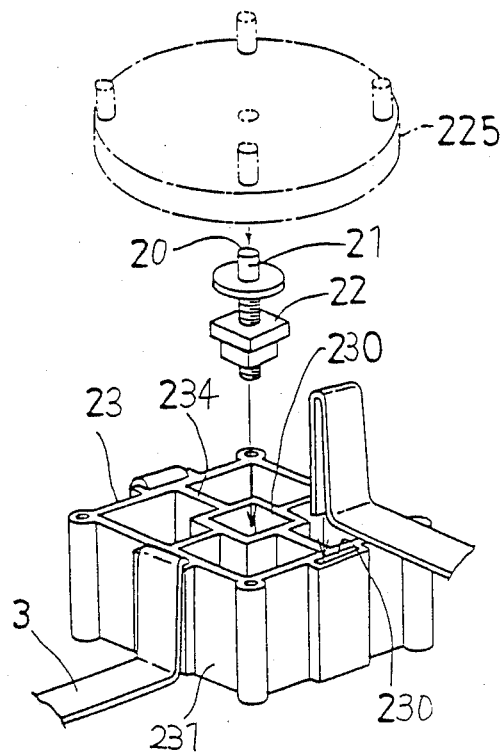
FIG. 50 is a disassembled perspective view showing another support member wherein the relation between the shoring and the floor board-engaging means engaged with the shoring is illustrated.

Said floor board-engaging means 20 may be detachably mounted on said engaging member of the connecting means 230 in place of supporting members 232 provided at the four corners of the pedestal 23. In this case, as shown in FIG. 50, a flange nut 22 having a cross section of the same shape (for example square) is placed in the engaging member of the connecting means 230 and the engaging member for fixing adjacent four floor boards 1 in a closely connected manner (for example a flange bolt 21, on which an engaging stand 225 can be laid, or the like) is screwed into this nut 22. Moreover, the pedestal 23 is provided with engaging members 230 having the same function as said engaging member of the connecting means 230 on four sides of the pedestal 23 and said connecting means 3 is detachably connected with this engaging member 230. The pedestal 23, the rib 234 and the engaging member of the connecting means 230 can be made of a thin-walled material. This assembly is made by cutting, for example, deformed extruded aluminium in slices at suitable lengths (40 mm, 80 mm, 120 mm and the like) and then subjecting these to further processing.

Figure 58:
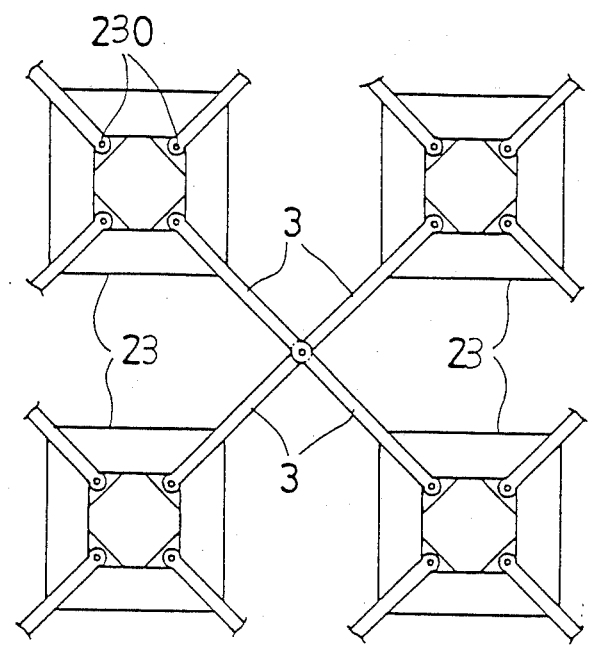
FIG. 58 is a plan view showing another example of the above described engagement.
Figure 59:
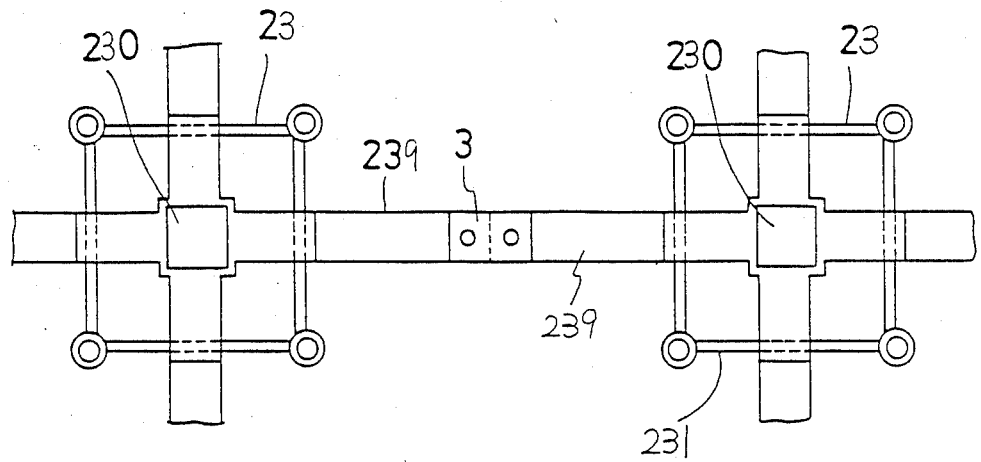
FIGS. 59(a) and 59(b) are a plan view and a front view showing another example of the above described engagement, respectively.
Figure 59:
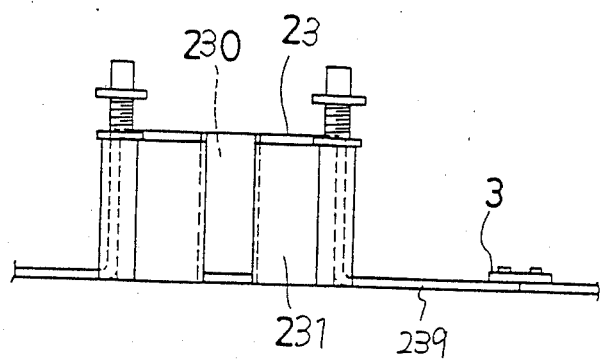
Figure 60:
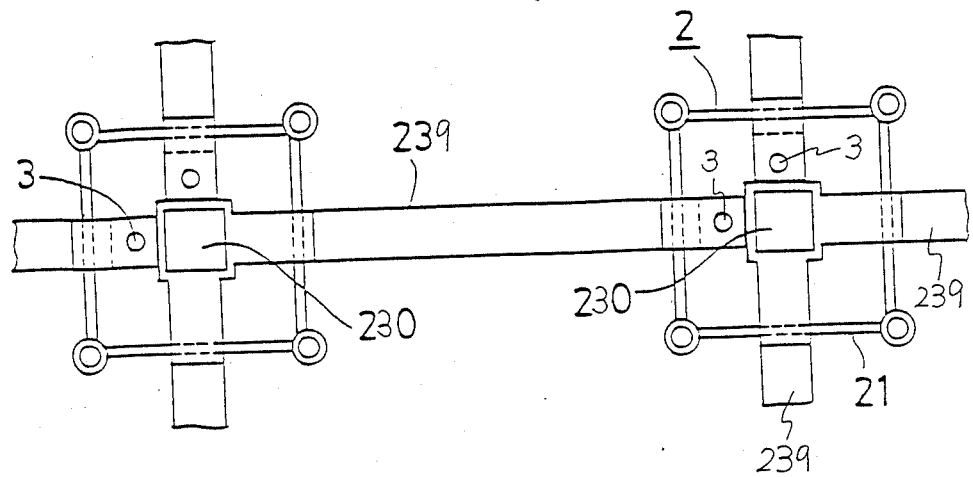
FIGS. 60(a) and 60(b) are a plan view and a front view showing another example of the above described engagement, respectively.
Figure 60:
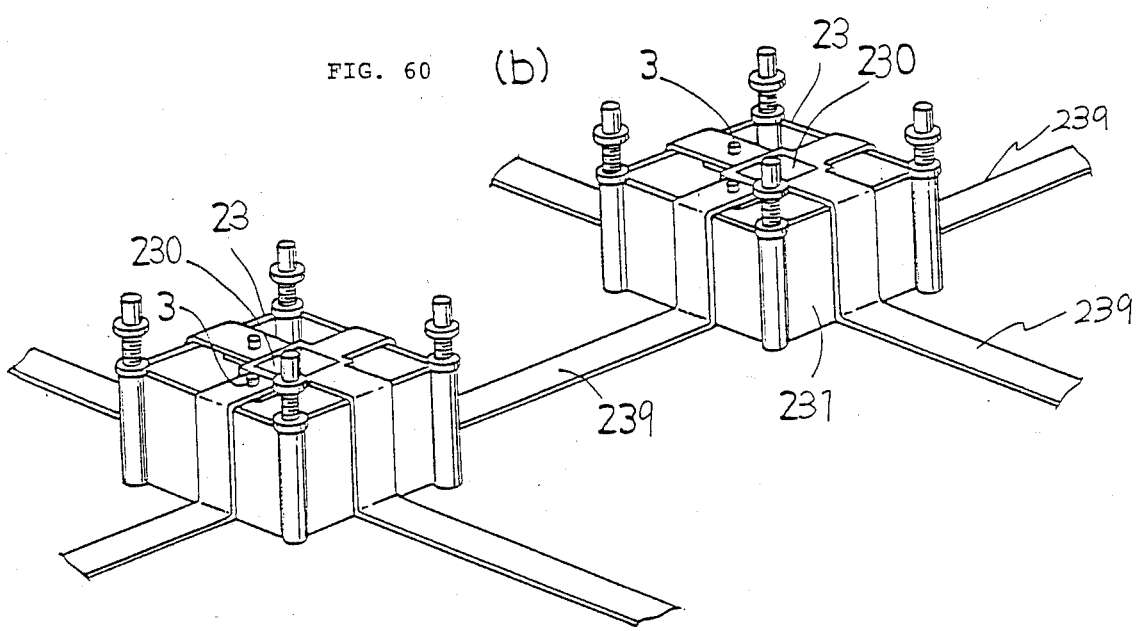

The pedestal 23 may be engaged with the connecting mean 3 in the following manners:

The engaging member of the connecting means 230 is composed of a notched hole and the T shaped end portion of the connecting means 3 is engaged with this notched hole, as shown in FIGS. 51(a) and 51(b); the notched hole positioned at the end portion of the connecting means 3 is engaged with the T shaped engaging member 230 of the pedestal 23, as shown in FIG. 52; the L shaped end portion of the connecting means 3 is fixed by means of a clip or the like of the engaging member 230 of the pedestal 23, as shown in FIG. 53; the end of the semiannular connecting member of the connecting means 3 is engaged with a semiannular engaging member 230 of the pedestal 23, as shown in FIG. 54; the end of the connecting means 3 is connected with a horizontally projecting engaging member 230 of the pedestal 23 by means of a clip, as shown in FIGS. 55(a) and 55(b); the L shaped end portion of the connecting means 3 is engaged with the L shaped engaging member 230 of the pedestal 23, as shown in FIG. 56; the projection-like engaging member 230 of the pedestal 23 is inserted into the engaging hole positioned at the end portion of the connecting means 3, as shown in FIGS. 57(a) and 57(b); pedestals 23 adjacent to each other in a diagonal line are connected by means of the connecting means 3, as shown in FIG. 58; the pedestal 23 composing the support member 2 has connecting arms 239 extending on four sides from the center thereof and the ends of the connecting arms 239 of the adjacent pedestals 23 are detachably inter-connected by the connecting means 3, a shown in FIGS. 59(a) and 59(b); and the pedestal 23 has connecting arms 239 extending on two sides from a center thereof and the connecting arms 239 extending from the adjacent pedestal 23 are detachably connected with said connecting arms 239 by means of connecting means 3 extending on other two sides, as shown in FIGS. 60(a) and 60(b).

It goes without saying that the pedestal 23 is not limited to the square pillar-shaped one described herein. Polygonal and column-shaped pedestals and the like may be used. Also a hollow cylindrical member may be used. Adhesives and double-sided tape can be applied to the bottom surface of the pedestal 23 is desired.

Figure 61:
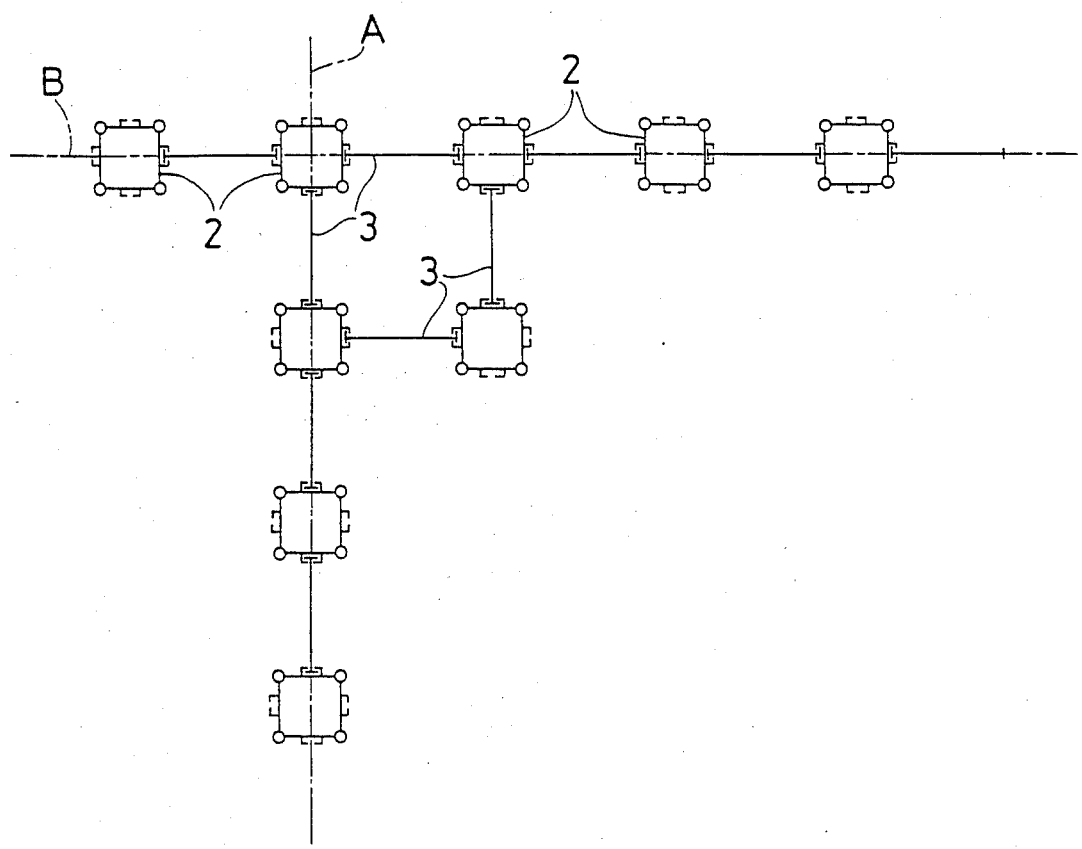
FIG. 61 is a plan view showing a method of installing a free access type floor according to the present invention.
Figure 62:
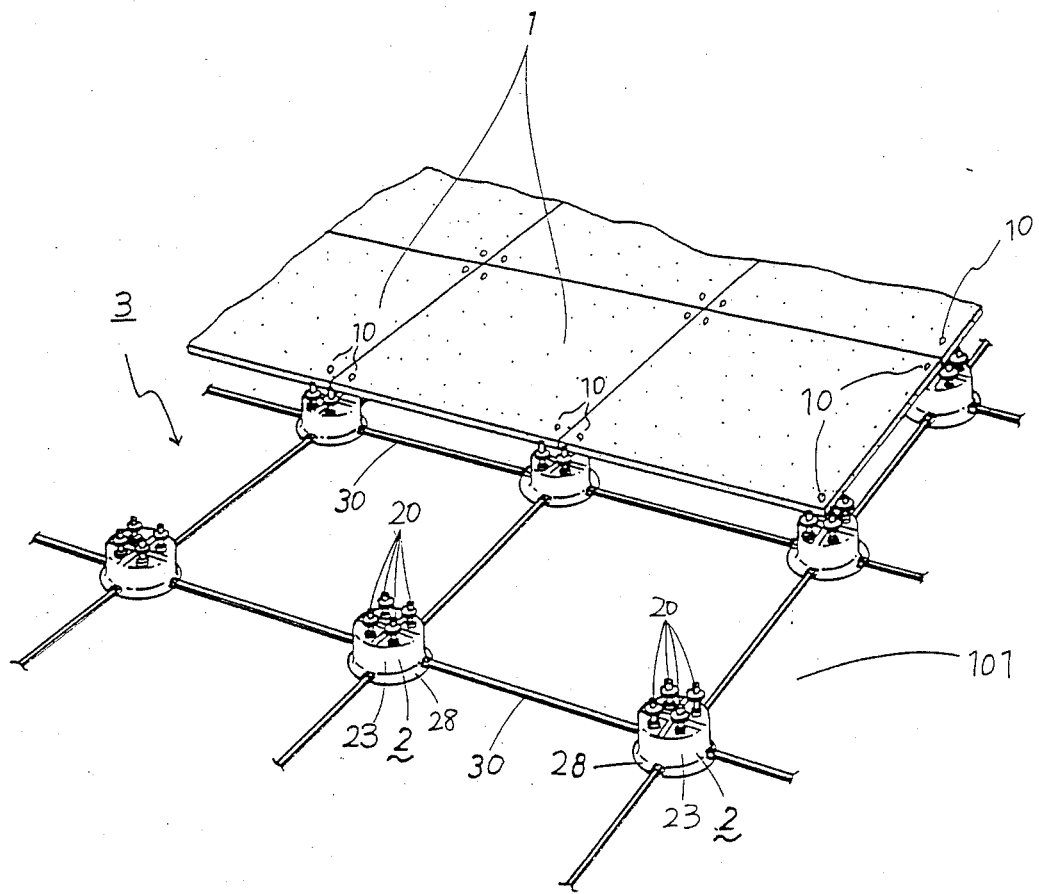
FIG. 62 is a perspective view showing the condition of another free access type floor assembled according to the present invention.
Figure 63:
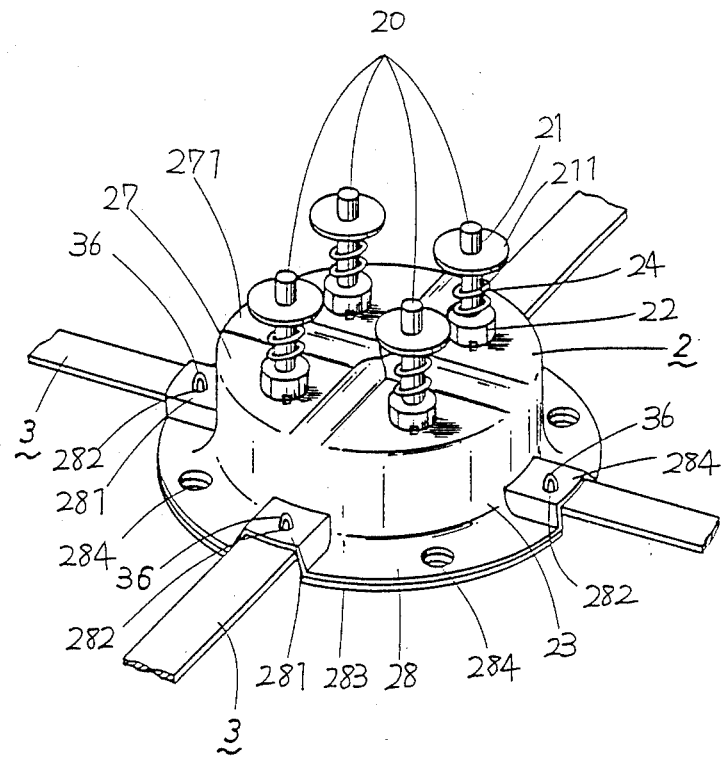
FIG. 63 is a perspective view showing the support member in the free access type floor shown in FIG. 62.
Figure 64:
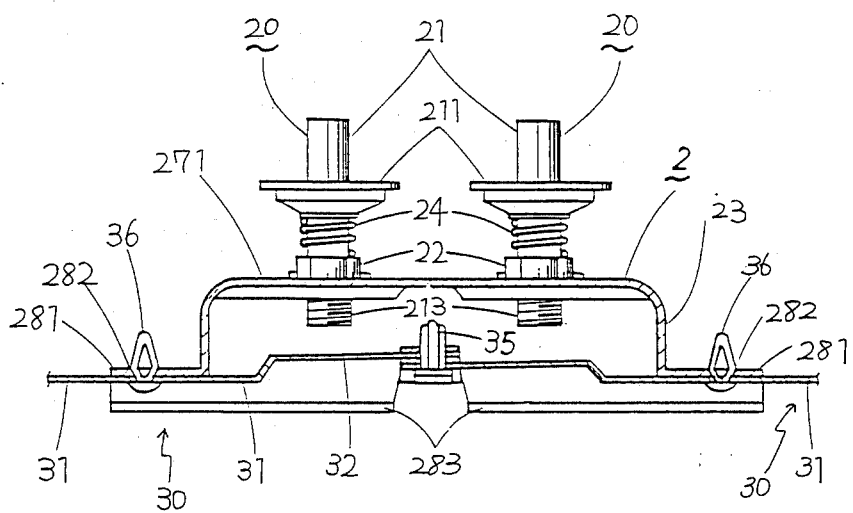
FIG. 64 is a sectional view showing the support member shown in FIG. 63.
Figure 65:
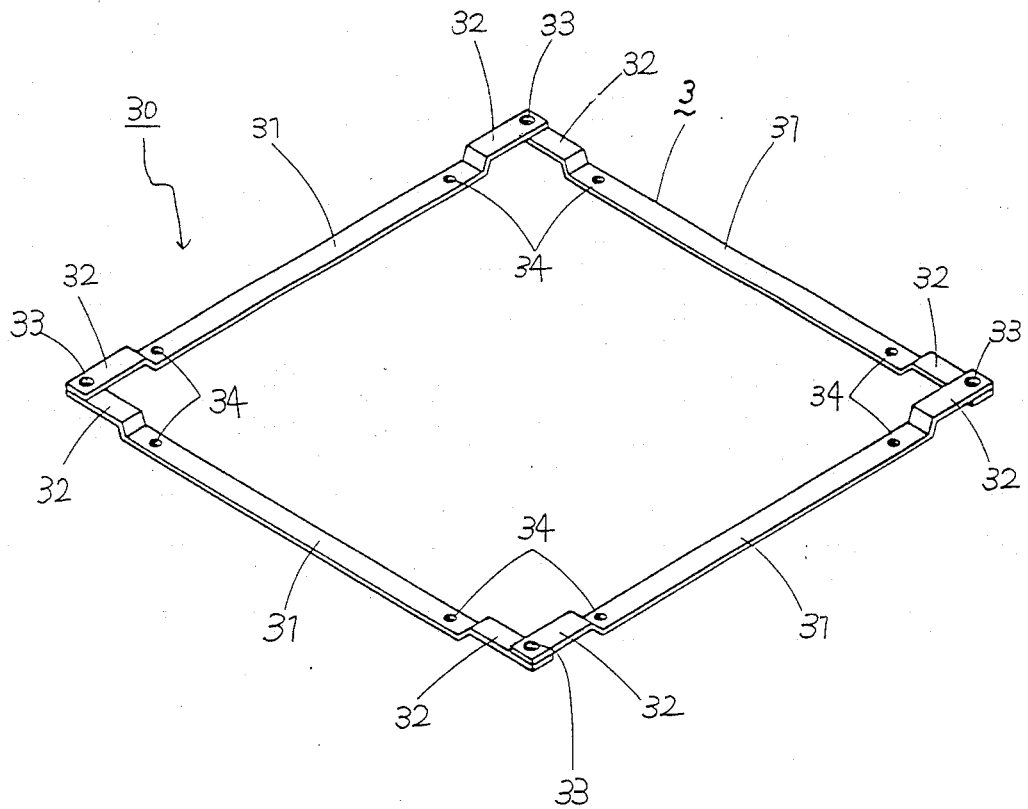
FIG. 65 is a perspective view showing a connecting frame.
Figure 66:
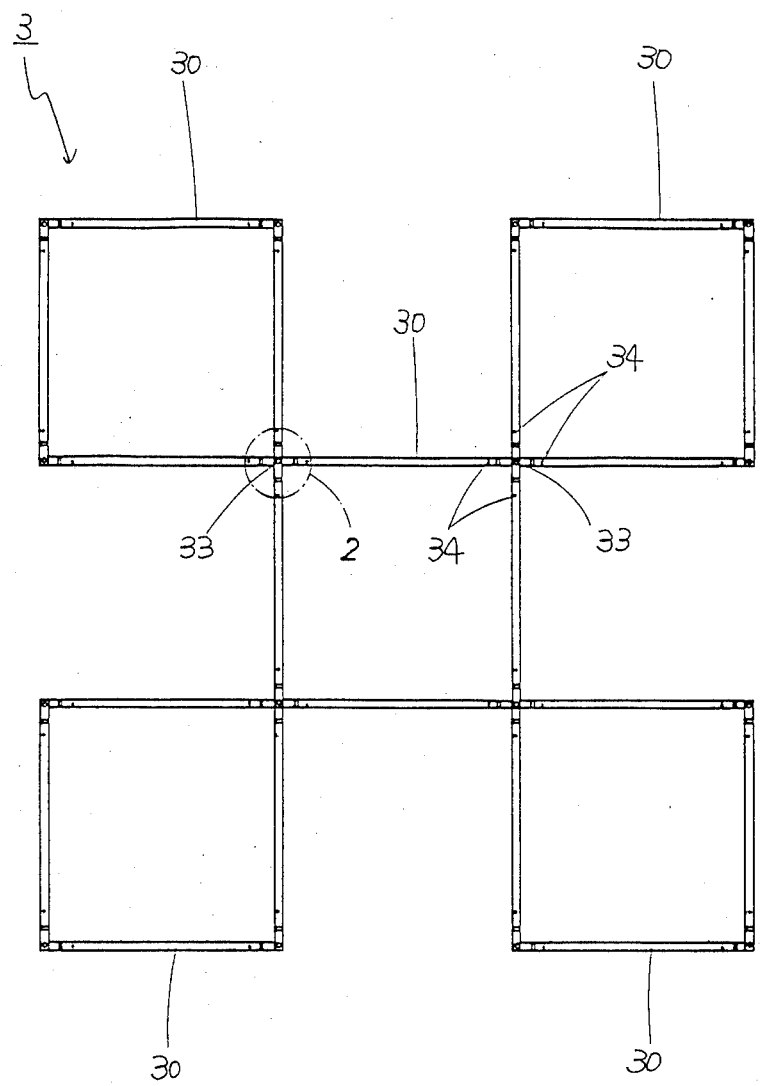
FIG. 66 is a plan view showing the connection of a connecting frame when assembled.

A free access type floor, in which support members 2 are connected by means of connecting means 3, is laid on the appointed floor surface in the following manner:

First, one longitudinal line and one lateral line are inked in the central area of the primary floor 101 to form the base lines (i.e., marking lines) A, B, as shown in FIG. 61. Subsequently, the positions of support members 2 to be laid are determined by placing marks at suitable regular intervals (for example 2–3 mm) along the base lines A, B from the intersecting point of the base lines A and B. The support members 2 are positioned at these positions and connected in turn by means of the connecting means 3. Since the support members 2 are connected on four sides, they do not shift even though they are not directly mounted on the primary floor 101. Then, the wiring is carried out. Next, floor boards 1 are laid on the support members 2 and the heads of flange bolts 21 of the support members 2 are engaged with engaging holes 10 of the floor panels 1 to complete the positioning. After completion of the construction of all floor panesl 1 the flange bolts 21 are suitably adjusted to form a secondary floor 100 on a single plane.

EXAMPLE 7

In order to make the floor vibration resistant, it is desirable that the pedestal 23 of the support member 2 be of a cylindrical shape, a columnar shape or a truncated conical shape, as shown in FIGS. 62–66. The pedestal 23 according to this preferred embodiment as shown in the drawings is formed in the form of cylinder the upper portion of which is covered. The pedestal 23 is provided with a cross-like reinforcing rib 271 passing through the center thereof on the upper surface 27 thereof and a flange 28 in the lower portion thereof. The pedestal 23 is made from a pressed steel plate. Moreover, it is desirable that the relation between the height and diameter (the diameter of the bottom in the case of a truncated cone pedestal) of the pedestal 23 be within the range shown in the following table to insure vibration resistance.

TABLE 1

| Height (mm) | Diameter (mm) |
|---|---|
| 0–120 | 100 |
| 120–200 | 125 |
| 200–275 | 150 |

The flange 28 is provided with four convex portions 281 at the positions thereof corresponding to said reinforcing ribs 271 and each of said convex portions 281 is provided with an engaging hole 282 passing therethrough for connecting the connecting means 3 therewith. In addition, the flange 28 is provided with a buffer member 283 formed of rubber sheets, nonwoven textiles and the like and mounted on the lower surface thereof, if desired, making it adaptable to a slightly uneven floor and absorbing noise generated by travel on the floor. Reference numeral 284 designates a locking hole for mounting the support member 2 on the floor 101 by means of adhesives or anchor bolts when greater vibration resistance is required. In the case where the support member 2 is mounted on the floor 101, said buffer member 283 is unnecessary.

Engaging members 20 are inserted into the engaging holes 10 of the adjacent floor boards 1. The secondary floor is formed by supporting the adjacent floor boards 1 on a single plane in a closely connected manner. Said engaging member 20 is composed of the flange bolt 21 the lower end 213 of which passes through the upper surface 27 of the pedestal 23 through the nut 22 mounted on said upper surface 27 of the pedestal 23 and a compression spring 24 is provided between the flange bolt 21 and the nut 22. The collar 211 can be moved up and down by rotating the flange bolt 21 relatively to the nut 22 and simultaneously, the positional relation between the compression spring 24 and the floor board 1 can be stabilized.

The connecting means 3 is composed of a connecting steel frame 30. The connecting frame 30 is of a square shape with for connecting members 31 and it is nearly equal to said floor panel 1 in size. The connecting member 31 is a long plate member both end portions of which are bent to form a stepped portion 32, said stepped portion 32 being provided with a frame-engaging hole 33 for connecting the connecting members 31 to each other, and a pedestal-engaging hole 34 for engaging the engaging hole 282 of the pedestal 23 and connecting the adjacent support members 2 with each other is provided on this side of the stepped portion 32. Thus, the connecting frame 30 is formed by assembling the connecting members 31 in a square shape by placing the frame-engaging holes 33 provided on the stepped portions 32 of the connecting members 31 in a line and fixing both ends of the adjacent connecting members 31 by, for example, spot welding or the like. Then, an elastic frame clip 35 is used to connect the connecting member 31 with each other while an elastic shore clip 36 is used to engage the engaging hole 282 of the pedestal 23 with the pedestal-engaging hole 34 of the connecting member 31. Moreover, at the stepped portion 32, the adjacent connecting members 31 of the adjacent connecting frame 30 overlap. Accordingly, the end portions of three connecting members overlap at each end portion of every connecting member. Therefore, the height of the stepped portion provided at each end portion of the connecting member is different depending upon the position of the overlapping segment.

Next, the assembly of the floor according to the present invention will be described.

First, the position of the support member 2 to be laid first and the extending direction (two directions meeting at right angles to each other) of the connecting frame 30 previously formed in a regular square-shaped framework are determined with reference to a layout. Subsequently, the frame-engaging hole 33 of the connecting frame 30 is arranged so as to be positioned at the center of the support member 2, other connecting frames 30 being arranged along said determined extending direction, and the frame-engaging holes 33 of the adjacent connection frames 30 being engaged with each other in turn by means of frame clips 35 to connect the connecting frames 30 with each other, whereby the connecting frames 30 are laid at the appointed positions (see FIG. 66). Then, the adjacent support members 2 are connected with each other through the connecting frames 30 by aligning the center of the support member 2 with the position engaged by the frame clip 35, aligning the connecting members 31 of the connecting frames 30 with the convex portions 281 of the flanee 28 and aligning the engaging holes 282 to engage with the pedestal-engaging holes 34 by means of the shoring clips 36, whereby the support members 2 are stably fixed. Next, the engaging members 20 of the fixed support members 2 are inserted into the engaging holes 10 of the floor board 1 through washers (not shown) provided with buffer members to form a secondary floor.

In addition, the adjacent support members 2 are not always connected to each other by means of the connecting frames 30 assembled in the previously described manner by the connecting members 31. That is to say, they can be connected to each other with the connecting members 31 alone, simplifying disassembly and transport of individual units.

Figure 67:
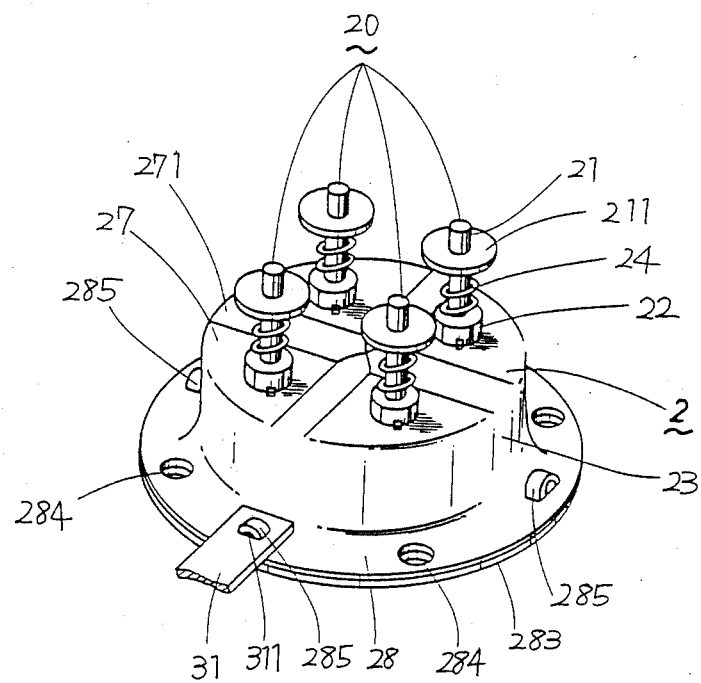
FIG. 67 is a perspective view showing another support member.
Figure 68:
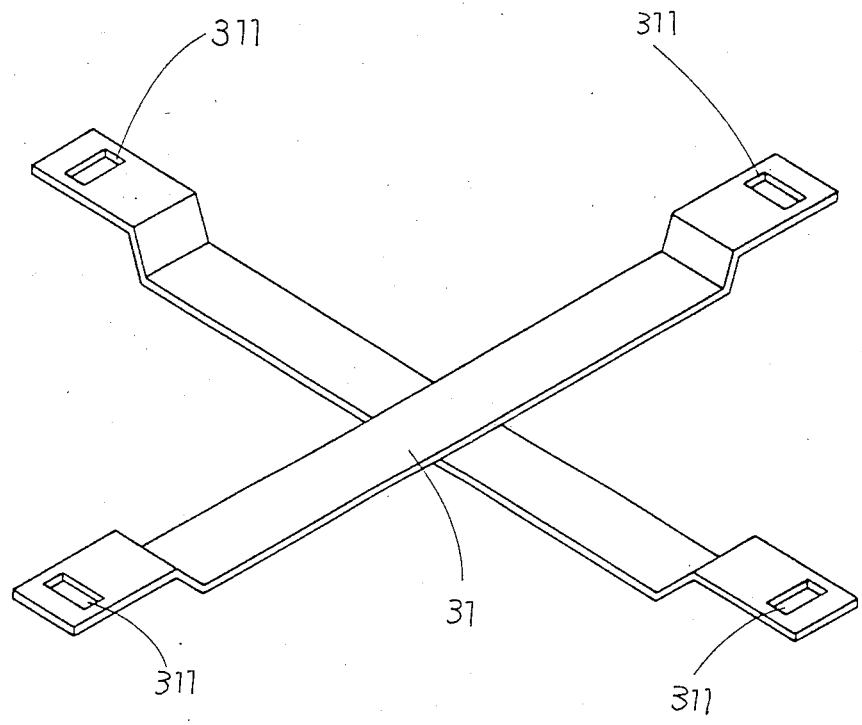
FIG. 68 is a perspective view showing a connecting frame in the support member shown in FIG. 67.
Figure 69:
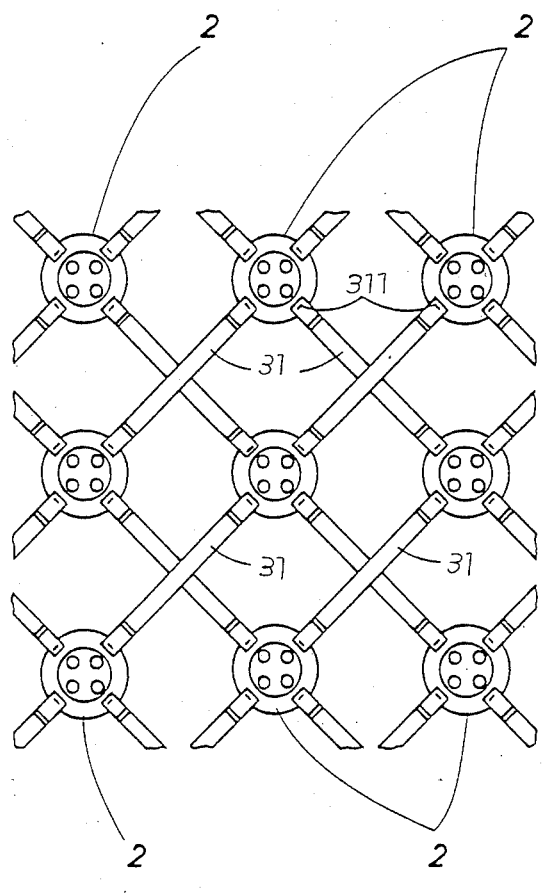
FIG. 69 is a rough plan view showing the connected condition of a support member with a connecting frame.

The cylindrical support member 2 may be constructed as shown in FIGS. 67–69. In this example the flange 28 of the support member 2 is provided with an engaging member 285 projecting from the upper surface thereof, the connecting members 31 of the connecting frame 30 being spliced with each other by, for example, spot welding or the like at central portions thereof to form a cross shape, and the crosslike assembly being provided with engaging holes 311 engaging with said engaging members 285 in the end portions of the connecting members 31. The support members 2 are connected to each other by engaging the engaging hole 311 of the connecting member 31 with the engaging member 285 of the adjacent support members 2. In addition, the positions of these support members 2 to be arranged are determined in turn if the extending direction of the support member 2 an the connecting member 31 to be arranged first is determined in the same manner as in the above described preferred embodiment.

EXAMPLE 8

Figure 70:
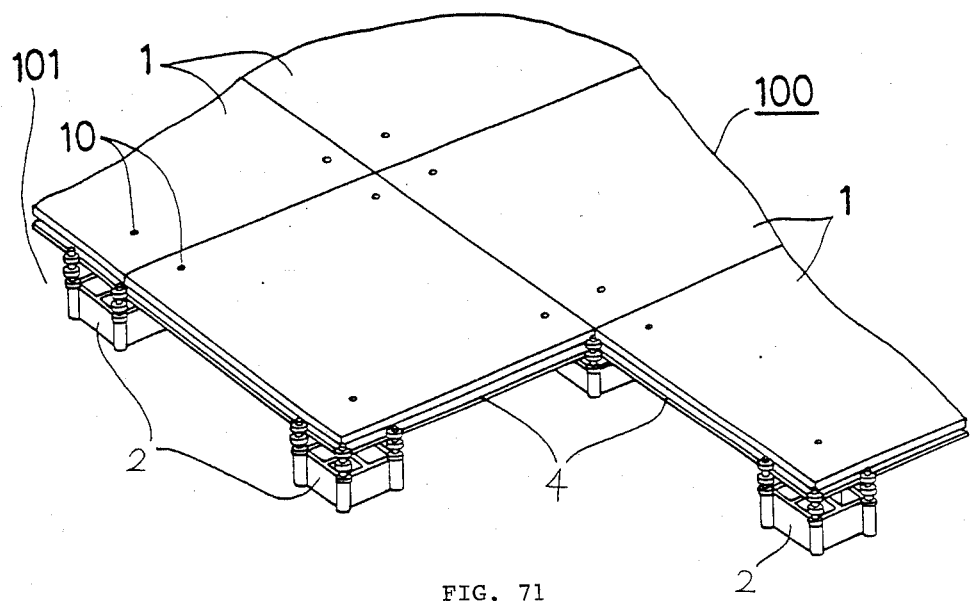
FIG. 70 is a partial perspective view showing a multi-layered free access type floor according to the present invention.
Figure 71:
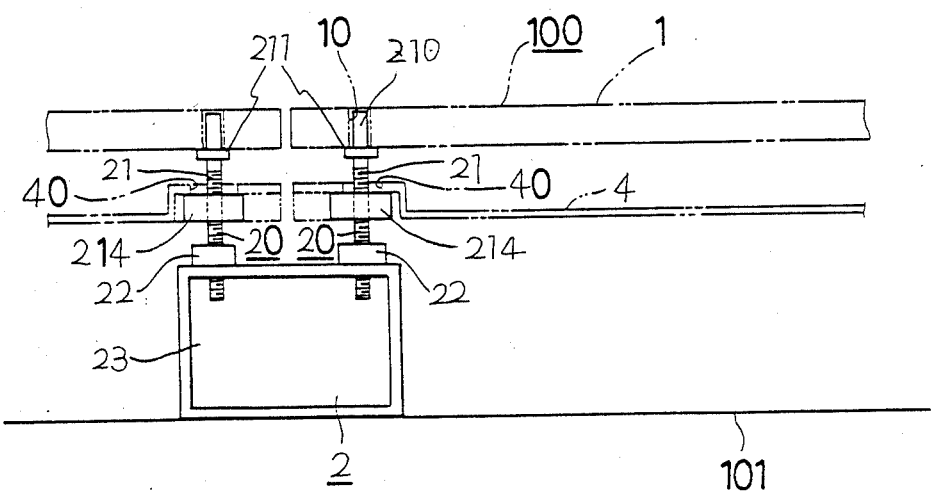
FIG. 71 is a front view showing principal parts of the multi-layered free access type floor shown in FIG. 70.
Figure 72:
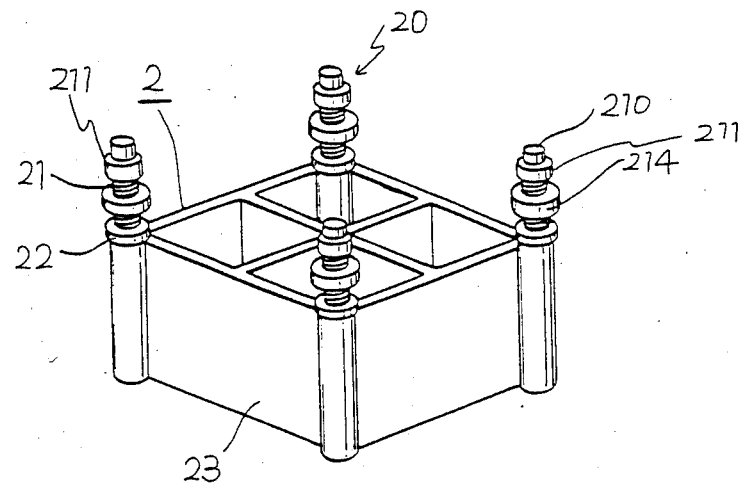
FIG. 72 is a perspective view showing a support member.

A free access type floor according to the present invention can be constructed in multiple layers, as shown in FIGS. 70 and 71. In this case, at least one layer of cable-housing separator 4 is arranged between the primary floor 101 and the floor board 1 through a support member 2. The support member 2 comprises an engaging means 20, which is adjustable in height, and a pedestal 23 for fixing said engaging means 20.

The engaging means 20 is composed of, for example, a flange bolt 21 mounted on four corners of the pedestal 23 through a nut 22. This flange bolt 21 is provided with a separator-engaging nut 214 between the head 210 thereof and the nut 22. The head 210 of the flange bolt 21 is detachably inserted into, for example, an engaging hole 10 of the adjacent floor boards 1 in one plane to support the floor boards 1 in a closely connected manner, thereby forming a secondary floor 100 on the primary floor 101. In the case where the engaging means 20 is composed of the flange bolt 21, the floor panel 1 is moved up and down by rotating the bolt 21 relatively to the nut 22 on the pedestal 23 to accurately and firmly insert the head 210 of the bolt 21 in the engaging hole 10 of the floor board 1, absorbing any unevenness in the height of the floor surface. Also the separator 4 is provided with engaging holes 40 at four corners thereof and is supported by means of a separator-engaging nut 214 and the corresponding flange bolt 21 passes through the engaging hole 40. Since the caliber of the engaging hole 40 is sufficiently larger than the thickness of the bolt 21, the separator 4 is engaged with the pedestal 23 so as to be able to be induced. The separator 4 is designed to accommodate or support light weight articles such as cables, so that it is not always necessary to securely support and fix the separator 4 as strongly as the floor board 1.

Figure 73:
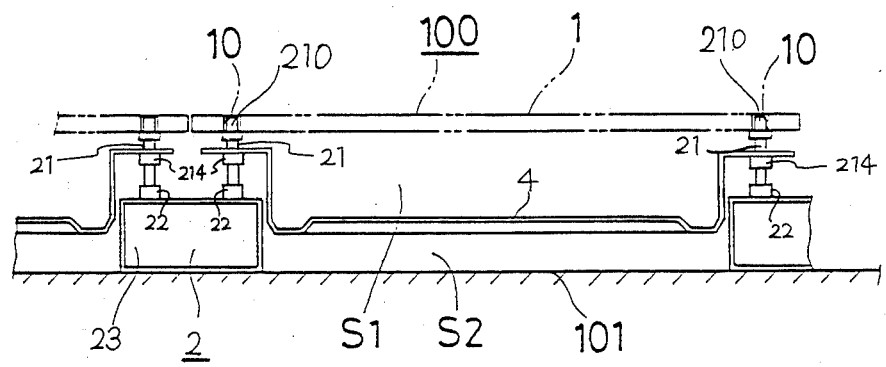
FIG. 73 is a front view showing the condition of a separator 4.
Figure 74:
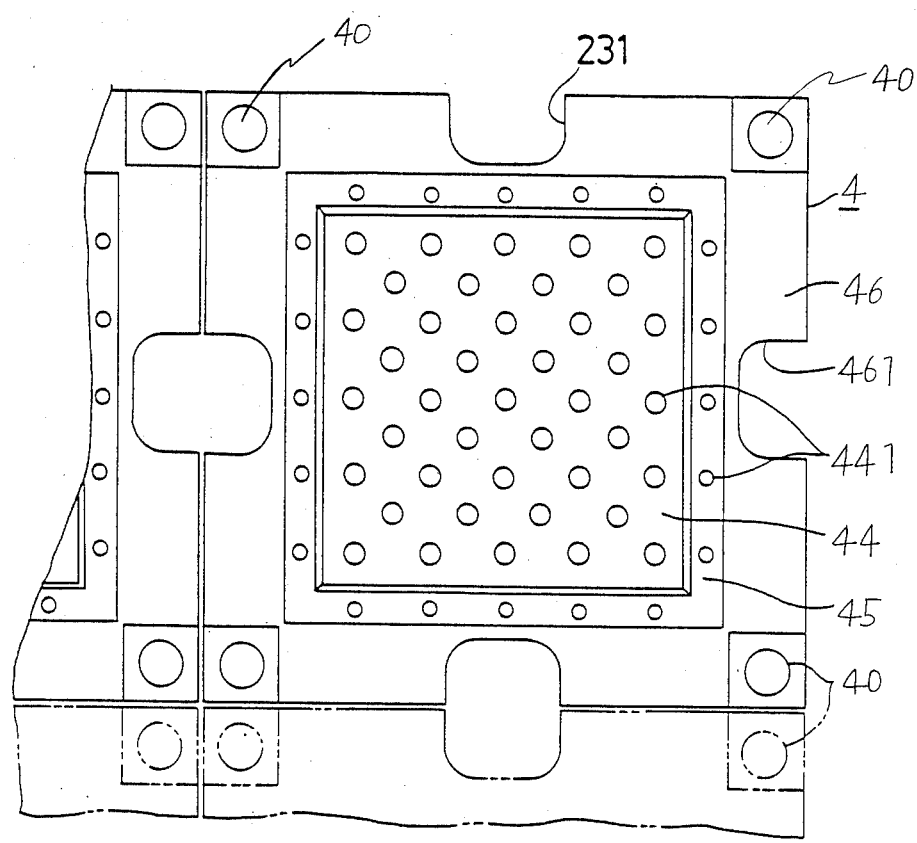
FIG. 74 is a plan view showing a separator.

The separator 4 may be provided with a plurality of drain holes 441 in the cable-housing area 44 thereof, as shown in FIGS. 73 and 74. The caliber of the drain hole 441 is not limited. Any drain hole capable of draining therethrough to the primary floor 101 from the secondary floor board 1 can be used.

In order to more effectively control the drain function of the separator 4, for example, the outermost portion of said cable-housing area 44 contains a groove 45 for directing the drainage into the primary floor 101 thereon. The drainage can be carried out also through the gap between the engaging holes 40 and the flagne bolts 21 inserted into said engaging holes 40.

The separator 4 is also provided with a notched portion 461 for inserting lead wires, such as cables, thereinto in the outer portion thereof. Wires, such as electric power cables arranged in space S1 defined by the floor board 1 and the separator 4 and signal cables arranged in space S2 defined by the separator 4 and the primary floor 101, can be removed or laid through the notched portion 461, whereby the wiring operation becomes remarkably simple. Also this separator 4 can be moved up and down to support it an appointed height from the floor surface by rotating the separator-engaging nut 214 relatively to the flange bolt 21. Thus the floor board 1 and the separator 4 are independently supported on the pedestal 23 through one and the same engaging means 20.

Figure 75:
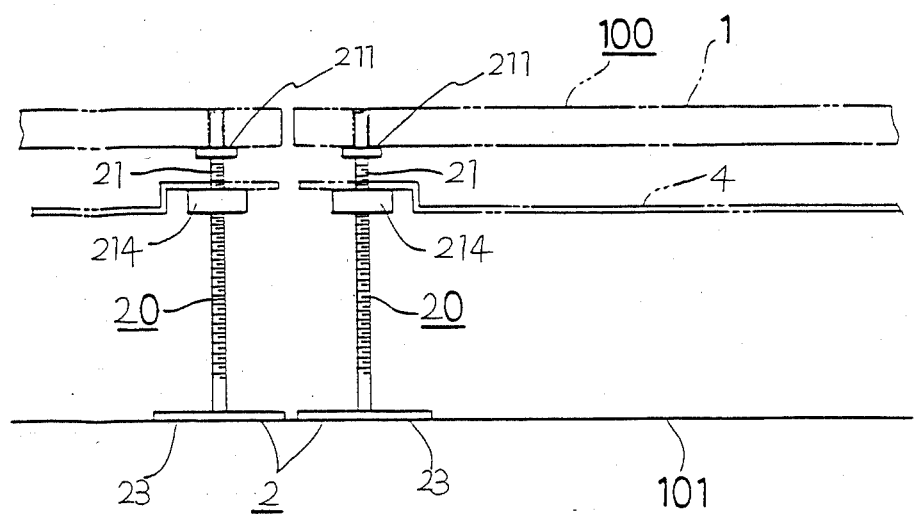
FIGS. 75 and 76 are front views showing principal parts in another separator, respectively.

Another example of the support member 2 of a multi-layer free access type floor comprises the engaging means 20 standing at the center of the pedestal 23, as shown in FIG. 75. Also in this case, the separator 4 is supported at an appointed height from the floor surface by rotating the separator-engaging nut 214 relatively to the flange bolt 21 to move the separator 4 up and down.

Figure 76:
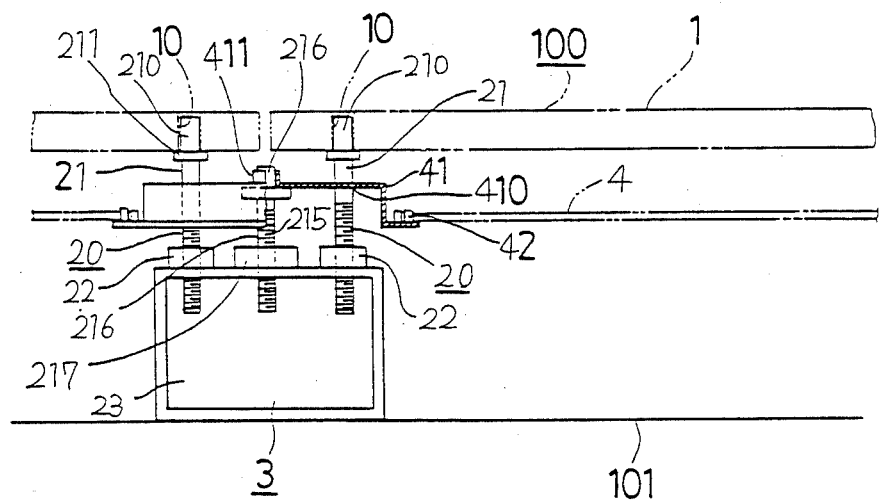
Figure 77:
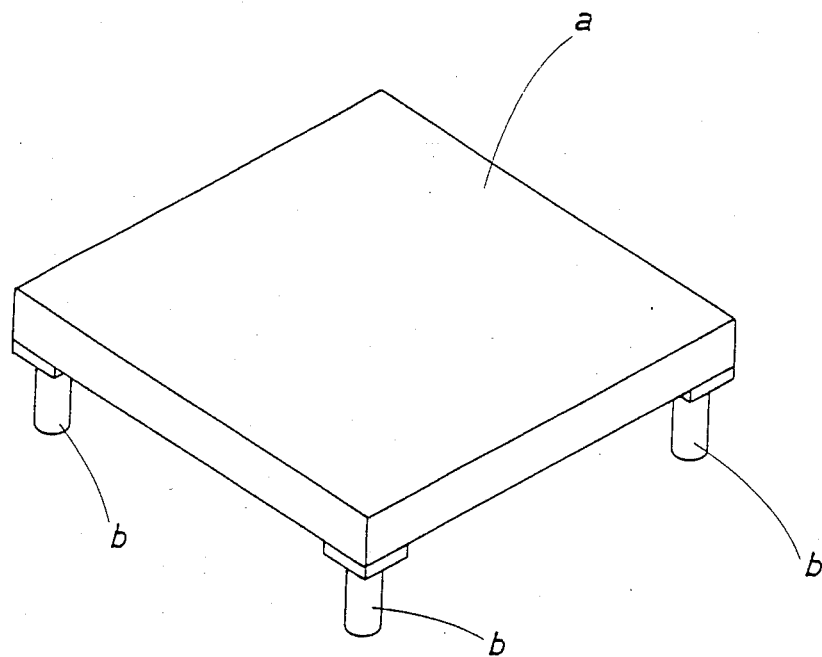
FIG. 77 is a perspective view showing a conventional integral type floor board.
Figure 78:
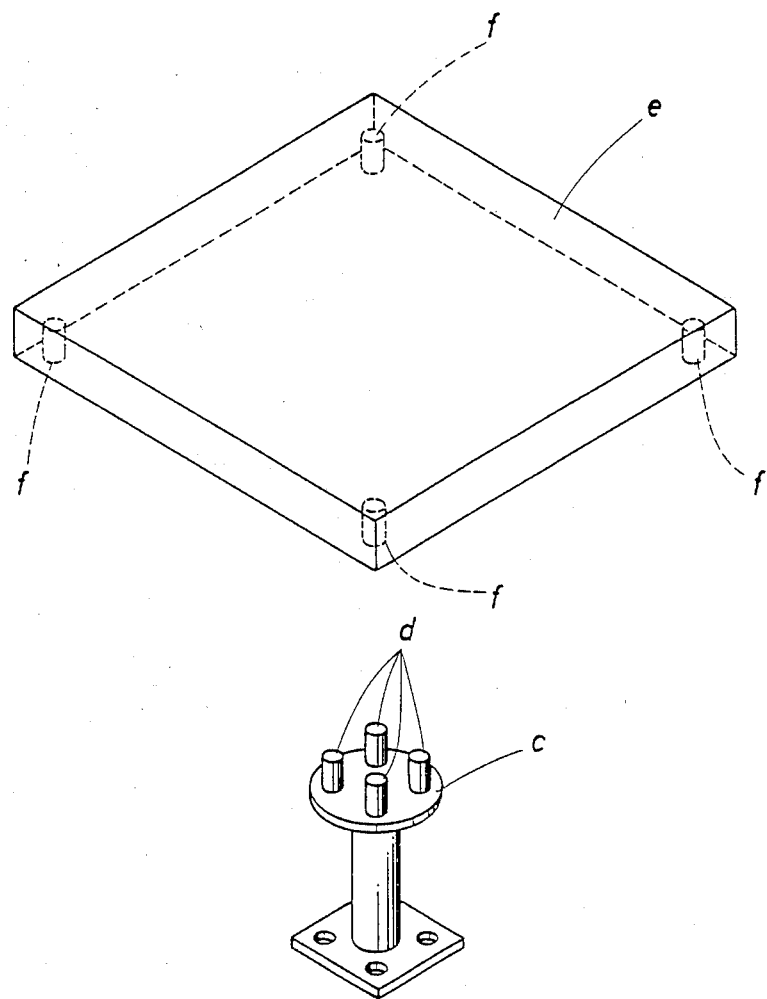
FIG. 78 is a perspective view showing a conventional separate type floor board.

A further example of the support member 2 of a multi-layer free access type floor comprises one pedestal 23 and an engaging means, which are mounted on said pedestal 23 and are independent of each other, (a floor board-engaging means 20 and a separator-engaging means 215), as shown in FIG. 76. The floor board-engaging means 20 is composed of a flange bolt 21 for use with the floor board and mounted on, for example, four corners of the pedestal 23 through a pedestal-engaging nut 22 in the same manner as in FIG. 71. The head 210 of this flange bolt 21 is detachably inserted into one of, for example, the adjacent engaging holes 10 of the adjacent floor boards 1 on one and the same plane to support the floor boards 1 in a closely connected manner, thereby forming a secondary floor 100 on the primary floor 101. The separator-engaging means 215 is composed of the flange bolt for use in the separator 216 and mounted on, for example, the center of the pedestal 23 through a pedestal-engaging nut 217. This separator-engaging means 215 is provided with a separator-connecting means 41 inserted into the engaging hole 411 formed at the center thereof and supported by the flange of the bolt. This separator-connected means 41 connects the adjacent separators 4 to each other by means of, for example, engaging members 42 provided at four corners thereof. Since this separator-connecting means 41 is provided with a hole 410 which passes through it at a position corresponding to the flange bolt 21, it is arranged at a position at which it is engaged with the separator-engaging means 215, in spite of the existence of the flange bolt 21 for use in floor board. Also, the floor board 1 can be moved up and down by rotating the bolt 21 relatively to the nut 22 on the pedestal 23 to accurately and firmly inserted the head 210 of the bolt 21 in the engaging hole 10 of the floor board 1 absorbing any unevenness in the height of the floor surface. Also the separator 4 can be moved up and down together with the separator-connecting means 41 by rotating the bolt 216 relatively ot the nut 217 on the pedestal 23 to support it at an appointed height from the floor surface.

Since the floor boards and the separators are engaged with the support members by means of independent engaging means, both the floor boards and the separators can be separately adjusted in height. In addition, since four separators are engaged with one separator-engaging means through separator-connecting means, these separators can be simulanteously adjusted in height, whereby said adjustment is simplified.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A free access type floor comprising:
a plurality of floor boards arrranged on one plane in a closely connected manner to form as secondary floor; engaging members provided at at least each corner of each of said floor boards; and support members provided with floor board-engaging means, which are adjustable in height, for detachably engaging said engaging members of adjacent floor boards to support said floor boards in a closely connected manner; said engaging members including an engaging hole; said floor board-engaging means including a flange bolt; and said support member including a compression spring provided between said flange bolt and said support member.

2. A free access type floor as set forth in claim 1, in which the distance between the centers of said adjacent engaging members of the adjacent floor boards on one and the same plane is set so as to be larger than the distance between the centers of said floor board-engaging means corresponding to said distance between said engaging members.

3. A free access type floor as set forth in claim 1, in which both said flange bolt and said hole engageable with said flange bolt have a deformed longitudinal section.

4. A free access type floor as set forth in claim 1, in which a short collar tube is inserted into said engaging hole.

5. A free access type floor as set forth in claim 1, in which a buffer member is inserted between said engaging member and said floor board-engaging means, said buffer member being brought into contact with the end face of each corner of said engaging means and the floor board by engaging said engaging member with said floor board-engaging means.

6. A free access type floor as set forth in claim 5, in which the end face of said buffer member connected to the end face of each corner of the floor board is tapered.

7. A free access type floor as set forth in claim 1, in which said support member is provided with a pedestal integrally provided with an engaging means-supporting portion for detachably supporting said floor board-engaging means.

8. A free access type floor as set forth in claim 7, in which said floor board-engaging means is a flange bolt.

9. A free access type floor as set forth in claim 8, in which said pedestal is a nut member screwed in the flange bolt and mounted on the floor.

10. A free access type floor as set forth in claim 8, in which said engaging means-supporting portion is a nut member screwed on the flange bolt.

11. A free access type floor as set forth in claim 8, in which said engaging means-supporting portion of the pedestal is a cylindrical body provided with a cavity having a polygonal section vertical to the axis shaft line thereof, said flange bolt being detachably supported by a cylindrical body-supporting portion through a flange nut having a polygonal cross section attached to said supporting portion of said cylindrical body.

12. A free type floor as set forth in claim 11, in which said engaging means-supporting portion is positioned at each of the four corners of said pedestal.

13. A free access type floor as set forth in claim 11, in which said engaging means-supporting portion is positioned at the center of the pedestal.

14. A free access type floor as set forth in claim 8, in which said pedestal is in the shape of a cylinder, cone, or truncated cone.

15. A free access type floor as set forth in claim 1, said support members are connected to each other by means of a detachable connecting means.

16. A free access type floor as set forth in claim 15, in which said connecting means is provided with connecting members previously constructed in the form of a framework.

17. A free access type floor as set forth in claim 16, in which said connecting member is provided with a stepped portion at each of the end portions thereof.

18. A free access type floor as set forth in claim 17, in which said stepped portions provided at the end portions of the connecting member are engaged with each other one upon another.

19. A free access type floor as set forth in claim 15, in which said support member is provided with a pedestal provided with engaging members of the connecting means on four sides, said connecting means being composed of a connecting member which can be detachably connected with said engaging members of the connecting means of the pedestal at both ends thereof.

20. A free access type floor as set forth in claim 19, in which said support member is provided with a pedestal provided with connecting arms extending on four sides, the ends of said connecting arms being detachably connected with each other by means of said connecting means.

21. A free access type floor as set forth in claim 19, in which said support member is provided with a pedestal provided with connecting arms extending on two sides, the connecting arms extending from the adjacent pedestal being detachably connected with each other by means of said connecting means provided on the other two sides of said pedestal.

22. A free access type floor as set forth in claim 15, in which said pedestal is provided with an engaging member of the connecting means for detachably connecting said connecting means with each other at the center thereof.

23. A free access type floor as set forth in claim 15, in which said pedestal is provided with a frame member.

24. A free access type floor as set forth in claim 23, in which said frame member is provided with a reinforcing rib.

25. A free access type floor as set forth in claim 23, in which said frame member is provided with a cover plate covering the base.

26. A free access type floor as set forth in claim 25, in which said cover plate is mounted on the base of the frame member by welding.

27. A free access type floor as set forth in claim 25, in which said cover plate is mounted on the base of the frame member by engaging a support rod standing at a corner thereof with said floor board engaging means-supporting portion of the frame member.

28. A free access type floor as set forth in claim 1, in which at least one layer of the cable-separator is detachably engaged with said support member.

29. A free access type floor as set forth in claim 28, in which said cable-separator is adjustable in height.

30. A free access type floor as set forth in claim 29, in which said cable-separator is engaged in the floor board-engaging means of the support member.

31. A free access type floor as set forth in claim 29, in which said cable-separator is supported on the support member by engaging means which are independent of said floor board-engaging means.

32. A free access type floor as set forth in claim 28, in which said cable-separator is provided with drain holes in the cable-housing area.

33. A free access type floor as set forth in claim 32, in which the outermost portion of said cable-housing area of said cable-separator forms a drain groove.

34. A free access type floor as set forth in claim 28, in which said cable-separator is provided with wire-inserting notched portions in the outer portions thereof.

35. A free access type floor comprising:
a plurality of floor boards arranged on one plane in a closely connected manner to form a secondary floor; engaging members provided at least each corner of each of said floor boards; and support members provided with floor board-engaging means including a flange bolt and a compression spring, said compression spring surrounding said flange bolt, which are adjustable in height, for detachably engaging said engaging members of adjacent floor boards to support said floor boards in a closely connected manner; and means to connect support members together.

* * * * *